US008156437B2

(12) United States Patent
Karasawa et al.

(10) Patent No.: US 8,156,437 B2
(45) Date of Patent: Apr. 10, 2012

(54) CREATION OF IMAGE DESIGNATING FILE AND REPRODUCTION OF IMAGE USING SAME

(75) Inventors: Toru Karasawa, Shiojiri (JP); Shoichi Akaiwa, Matsumoto (JP); Miki Nagano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 988 days.

(21) Appl. No.: 11/508,900

(22) Filed: Aug. 24, 2006

(65) Prior Publication Data
US 2006/0288293 A1 Dec. 21, 2006

Related U.S. Application Data

(63) Continuation of application No. 10/048,027, filed as application No. PCT/JP01/04879 on Jun. 8, 2001, now Pat. No. 7,246,317.

(30) Foreign Application Priority Data

Jun. 9, 2000 (JP) ................ 2000-174142
Jun. 9, 2000 (JP) ................ 2000-174150
Jun. 12, 2000 (JP) ................ 2000-175874

(51) Int. Cl.
*G06F 3/00* (2006.01)
*G06F 17/00* (2006.01)
(52) U.S. Cl. ........ 715/730; 715/731; 715/732; 715/201; 715/239
(58) Field of Classification Search .............. 715/730, 715/732, 769, 239, 201, 731; 707/200
See application file for complete search history.

(56) References Cited

U.S. PATENT DOCUMENTS

| 4,234,933 A | 11/1980 | Adelson et al. |
| 5,680,619 A | 10/1997 | Gudmundson et al. |
| 5,767,852 A | 6/1998 | Keller et al. |

(Continued)

FOREIGN PATENT DOCUMENTS
EP 0 572 031 A1 12/1993
(Continued)

OTHER PUBLICATIONS

Supplementary Partial European Search Report under Rule 46(1) EPC relating to European Patent Application No. 01936934.7-2218 PCT/JP0104879, issued Jun. 26, 2006.

(Continued)

*Primary Examiner* — Ting Lee
(74) *Attorney, Agent, or Firm* — Oliff & Berridge, PLC

(57) ABSTRACT

A technique for enabling scenario files and image files for supply to a scenario generating device to be created easily is provided. The scenario creating device creates a scenario file supplied to a scenario reproducing device capable of reproducing only image files of a predetermined format. The scenario creating device comprises: an input section including a pointing device; a display section; and a scenario creating section for creating the scenario file. The scenario creating section provides a display of an execution icon on the display screen for causing the scenario creating section to execute a process. When a file icon for a source file of a predetermined format including pagewise scenario information and image information is dragged and dropped on the execution icon by means of operation of the pointing device, a scenario file is created on the basis of the scenario information, and an image file of the predetermined format is generated on the basis of the image information.

9 Claims, 29 Drawing Sheets

U.S. PATENT DOCUMENTS

| | | | |
|---|---|---|---|
| 5,859,623 | A | 1/1999 | Meyn et al. |
| 5,960,444 | A | 9/1999 | Jackson |
| 6,072,480 | A | 6/2000 | Gorbet et al. |
| 6,496,190 | B1 | 12/2002 | Driemeyer et al. |
| 2001/0033296 | A1 | 10/2001 | Fullerton et al. |
| 2002/0120939 | A1* | 8/2002 | Wall et al. ................ 725/87 |

FOREIGN PATENT DOCUMENTS

| | | |
|---|---|---|
| EP | 0 631 246 A2 | 12/1994 |
| EP | 0 717 544 A2 | 6/1996 |
| JP | A 6-259521 | 9/1994 |
| JP | A 8-153104 | 6/1996 |
| JP | A-8-272715 | 10/1996 |
| JP | A 10-116168 | 5/1998 |
| JP | A-10-171728 | 6/1998 |
| JP | A-10-290372 | 10/1998 |
| JP | A-2000-98986 | 4/2000 |
| JP | A 2000-98986 | 4/2000 |

OTHER PUBLICATIONS

Machine-generated English translation of JP-A-06-259521 (previously submitted on Aug. 30, 2006).

Noriyuki Hayashi et al., "Auto Browsing System with Weak Interaction," Collected Papers of Multimedia, Distributed, Cooperative and Mobile Workshop; Sep. 1997, NTT Software Laboratories, Japan.

Japanese Patent Office, "Notification of Reason for Refusal for Japanese Patent Application No. 2008-079486 (with English translation)," dated Nov. 16, 2010, pp. 1-2 (pp. 1-3 for translation).

Oct. 28, 2010 Office Action in U.S. Appl. No. 11/512,143.

* cited by examiner

Fig.7

```
                                    SF1
begin                              (L1)
    Display "Page1.jpg"            (L2)
    Pause                          (L3)
    Display "Page2.jpg"            (L4)
    Pause                          (L5)
    Display "Page3.jpg"            (L6)
    Play "Wave1.wav"               (L7)
    Pause                          (L8)
    Display "Page4.jpg"            (L9)
    Wait 10000msec                 (L10)
    Display "Page5.jpg"            (L11)
    Wait 10000msec                 (L12)
    Display "Page6.jpg"            (L13)
    Wait 10000msec                 (L14)
    Display "Page7.jpg"            (L15)
    Wait 10000msec                 (L16)
end                                (L17)
```

Fig.14

```
begin                                              (L1)
    Display "¥mem¥Picture.ppt/page1"               (L2)
    Pause                                          (L3)
    Display "¥mem¥Picture.ppt/page2"               (L4)
    Pause                                          (L5)
    Display "¥mem¥Picture.ppt/page3"               (L6)
    Pause                                          (L7)
    Display "¥¥SB¥FLDA¥PictureZ.ppt/page1"         (L8)
    Wait 10000msec                                 (L9)
    Display "¥¥SB¥FLDA¥Document.doc/page2"         (L10)
    Wait 10000msec                                 (L11)
    Display "¥¥SB¥FLDB¥Graph.xls/sheet3"           (L12)
    Wait 10000msec                                 (L13)
    Display "¥mem¥Picture.ppt/page1"               (L14)
    Wait 10000msec                                 (L15)
end                                                (L16)
```

SF1

Fig.21(A-1)
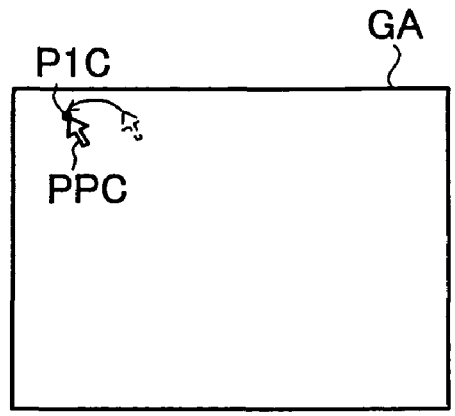
Fig.21(B-1)
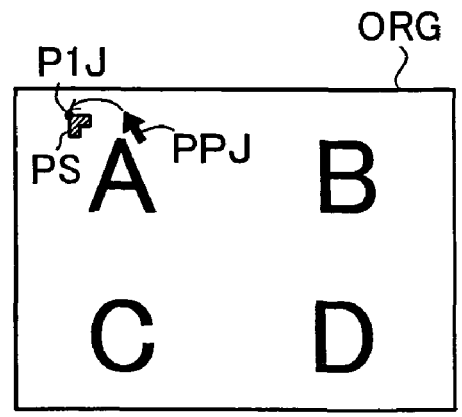
Fig.21(A-2)
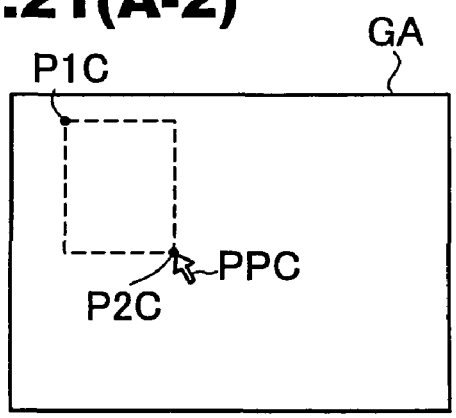
Fig.21(B-2)
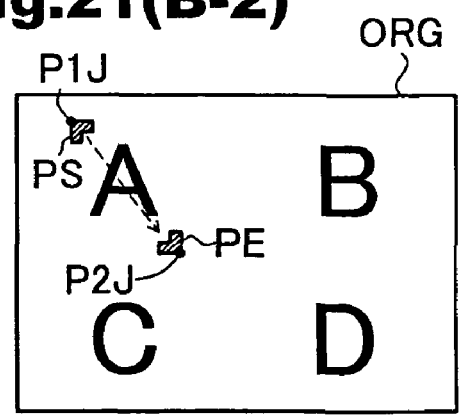
Fig.21(A-3)
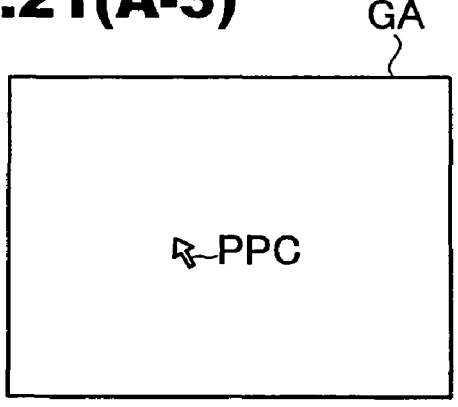
Fig.21(B-3)
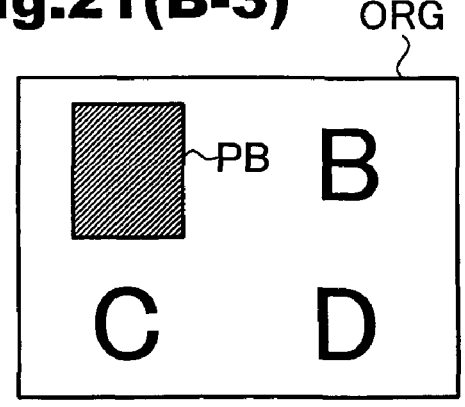

CREATION OF IMAGE DESIGNATING FILE AND REPRODUCTION OF IMAGE USING SAME

CROSS-REFERENCE TO RELATED APPLICATION

This is a continuation application of U.S. application Ser. No. 10/048,027 filed on Jan. 28, 2002, which is a National Stage Application of PCT/JP01/04879 filed in Japan on Jun. 8, 2001, the disclosures of which are hereby incorporated by reference in their entirety.

BACKGROUND

This invention relates to a technique for creating an image designating file that designates image files, such as scenario files and index files, and reproducing images using the image designating file.

Projection type display devices (i.e. projectors) can display enlarged images on a projection screen, and are therefore often used in presentations. In a typical presentation, a plurality of presentation sheets (also called "slides") are sequentially displayed in pages. This process is executed according to a scenario file representing pagewise sequential display of images. Image files used in accordance with scenario files and index files are prepared in advance by the user, and supplied to a projector.

However, in a projector, pagewise sequential display of images is sometimes difficult because it is relatively hard to create or describe scenario files using predetermined commands or prepare image files representing images for display according to a scenario file, in a format suitable for a projector.

Also, when reproducing an image file or a data file, the projector requires a storage device having capacity capable of storing the image file, and there is a need for a technique for reducing the required capacity of a storage device of a projector.

SUMMARY

This invention was made to solve the above-described problems of the prior art, and has as a first object to provide a technique for easy sequential display of pagewise images in a projector or other scenario reproducing device. It is a second object to provide a technique allowing the capacity of the storage device of a projector to be made relatively small.

At least part of the above and the other related objects is attained by a device pertaining to a first aspect of the present invention, which is a scenario creating device for creating a scenario file to be supplied to a scenario reproducing device capable of reproducing only image files of a predetermined format in accordance with a scenario file for pagewise sequential display of images. The scenario creating device comprises: an input section including a pointing device; a display section; and a scenario creating section for creating the scenario file in accordance with operation of the input section. The scenario creating section provides a display of an execution icon on the display section for causing the scenario creating section to execute a process. When a file icon for a source file of a predetermined format including pagewise scenario information and image information is dragged and dropped on the execution icon by means of operation of the pointing device, the scenario creating section creates the scenario file on the basis of the scenario information and generates the image files of the predetermined format on the basis of the image information.

According to this device, a user, by dragging and dropping of the file icon for a source file of predetermined format onto an execution icon for executing a process by a scenario creating section, can easily create a scenario file and image file of predetermined format using a source file of predetermined format.

The second aspect of the present invention is directed to a method, which is a scenario creating method for creating a scenario file in a scenario creating device comprising an input section including a pointing device and a display section. Here, the scenario file is supplied to a scenario reproducing device capable of reproducing only image files of a predetermined format in accordance with a scenario file for pagewise sequential display of images. The method comprises the steps of: (a) providing a display of an execution icon on the display section for causing the scenario creating section to execute a process; and (b) when a file icon for a source file of a predetermined format including pagewise scenario information and image information is dragged and dropped on the execution icon by means of operation of the pointing device, creating the scenario file on the basis of the scenario information and generating the image files of the predetermined format on the basis of the image information.

The method herein affords functions and advantages similar to those derived from use of the device herein, and it is possible to easily create a scenario file and image file of predetermined format using a source file of predetermined format.

The third aspect of the present invention is directed to a storage medium, which is a computer-readable storage medium storing a computer program for creating a scenario file in a scenario creating device comprising an input section including a pointing device and a display section. Here, the scenario file is supplied to a scenario reproducing device capable of reproducing only image files of a predetermined format in accordance with a scenario file for pagewise sequential display of images. The computer-readable storage medium comprises the computer program for causing a computer to implement the functions of: providing a display of an execution icon on the display section for causing the scenario creating section to execute a process; and when a file icon for a source file of a predetermined format including pagewise scenario information and image information is dragged and dropped on the execution icon by means of operation of the pointing device, creating the scenario file on the basis of the scenario information and generating the image files of the predetermined format on the basis of the image information.

By executing by means of a computer a computer program stored in this storage medium, it is possible, similar to the method of the present invention, to easily create a scenario file and image file of predetermined format using a source file of predetermined format.

It should be noted that the above mentioned invention may be implemented through various embodiments such as a computer program for implementing the function of a scenario creating device; a storage medium storing that computer program; a data signal containing that computer program embodied in a carrier wave, etc.

The fourth aspect of the present invention is directed to a device, which is a scenario creating device for creating a scenario file for pagewise sequential display of images. The device comprises: an input section including a pointing device; a display section; and a scenario creating section for creating the scenario file in accordance with operation of the input section. The scenario creating section provides a display of a scenario file creation area on the display section, the scenario file creation area including a file management area for displaying source files and a selected source file information area for displaying, in a sequence selected by a user, selected source file information representing information of a source file selected by the user in the file management area. Then, the scenario creating section creates the scenario file in response to a content of the display in the selected source file information area.

In this arrangement, scenario files can be created easily, simply by displaying selected source file information in a selected source file information area in a desired sequence. By supplying a scenario file created in this way to a projector or other scenario reproducing device, pagewise images can be sequentially displayed with ease.

In the above scenario creating device, it is preferable that the scenario creating section is capable of creating the scenario file indicating a plurality of source files. By so doing, scenario files can be created with ease, even where source files of multiple types of file format are used.

In the above scenario creating device, it is also preferable that the selected source file information is displayed in the selected source file information area when a file icon for a source file displayed in the file management area is dragged and dropped into the selected source file information area by means of operation of the pointing device. By so doing, scenario files can be created with ease, simply by operating a pointing device.

In the above scenario creating device, the selected source file information may include page indicating information indicating a page in the selected source file. By so doing, scenario files can be created using only a desired page, even where a source file has multiple page content.

In the above scenario creating device, it is preferable that the scenario creation area further includes: a reduced image display area for displaying pagewise image information as a reduced pagewise image with regard to a source file of a predetermined format including pagewise scenario information and image information, wherein the source file is displayed in the file management area. When a reduced pagewise image displayed in the reduced image display area is dragged and dropped into the selected source file information area by means of operation of the pointing device, the selected source file information including the page indicating information is displayed in the selected source file information area. In this way, by display of reduced images, content of pagewise images can be easily verified, so that scenario files can be created with ease, simply by operating a pointing device.

The above scenario creating device may further comprise: a network interface section for connection to a network. The scenario creating section may select a source file stored in another external device connected to the network, and create the scenario file. By so doing, scenario files can be created with ease using source files that have not been prepared in the scenario creating device.

The above scenario creating device may further comprise: a scenario supplying section for supplying the scenario file created by the scenario creating section to a scenario reproducing device but not supplying a source file, selected during creation of the scenario file, to the scenario reproducing device. By so doing, as source files are not stored in the scenario reproducing device, the memory capacity of the scenario reproducing device can be made relatively small. During execution of scenario files, the scenario reproducing device may read out source files from another external device etc.

The fifth aspect of the present invention is directed to a device, which is a projector for projecting and displaying images in accordance with a scenario file for pagewise sequential display of images. The device comprises: a page image processor for reading out a source file and preparing page image data representing a pagewise image for projected display according to the scenario file stored in a memory; an electro-optical device for forming image light in response to the page image data; and a projection optical system for projecting image light obtained with the electro-optical device. The page image processor prepares the page image data on the basis of the source files of multiple formats.

This projector comprises a page image processor capable of preparing page image data on the basis of multiple-format source files, so the trouble of specially preparing image files of predetermined format can be omitted. As a result of this, a projector can easily sequentially display pagewise images.

The above projector may further comprise: a network interface section for connection to a network. The page image processor may reads out via the network interface section a source file stored in another external device connected to the network, in accordance with the scenario file. By so doing, the projector does not need to store source files stored in another external device, so the memory capacity of the projector can be made relatively small.

The above projector may further comprise: a scenario supplying device for supplying the scenario file to the memory.

In the above projector, it is preferable that the scenario supplying device comprises: an input section including a pointing device; a display section; and a scenario supplying section for supplying the prepared scenario file to the memory. The scenario supplying section provides a display of an execution icon on the display section for causing the scenario supplying section to execute a process. When a file icon for a scenario file is dragged and dropped on the execution icon by means of operation of the pointing device, the scenario supplying section supplies the scenario file to the memory. By providing this kind of scenario supplying device, scenario files can be supplied to memory with ease, simply by operating a pointing device.

In the above projector, the scenario supplying device may further comprise: an operation information generator for detecting operation of the pointing device by a user and generating operation information on the basis of detection results. The operation information generator, upon supply of the scenario file to the memory by the scenario supplying section, may provide a display of an operation information generation area which is used in generating operation information due to operation of the pointing device. The operation information generator may generate the operation information due to operation of the pointing device only when a pointer image associated with the pointing device is displayed within the operation information generation area, and supply the operation information to the page image processor. The page image processor may prepare the page image data according to the supplied scenario file, synthesize the page image data and embellishment image data on the basis of the operation information, and superimpose an embellishment image represented by the embellishment image data on a predetermined location in a page image represented by the page image data. By so doing, the page image processor can easily superimpose, on the basis of operation information, an embellishment image in a page image prepared according to a scenario file.

In the above projector, the page image processor may automatically initiate processing according to the scenario file when the scenario file is supplied to the memory.

The sixth aspect of the present invention is directed to a device, which is a projector for projecting and displaying images. The projector comprises: a source file supplying device for supplying a source file that includes pagewise scenario information and image information; a page image processor for reading out the source file supplied by the source file supplying device and stored in a memory, and preparing page image data representing a pagewise image represented by the image information in accordance with the scenario information; an electro-optical device for forming image light in response to the page image data; and a projection optical system for projecting image light obtained with the electro-optical device. Here, the source file supplying device comprises: an input section including a pointing device; a display section; and a source file supplying section for supplying the source file to the memory. The source file supplying section provides a display of an execution icon on the display section for causing the source file supplying section to execute a process. When a file icon for the source file is dragged and dropped on the execution icon by means of operation of the pointing device, the source file supplying section supplies the source file to the memory.

This projector comprises a page image processor that can prepare page image data representing pagewise images using a source file of predetermined format as-is, so the trouble of creating a scenario file can be omitted. As a result of this, the projector can easily sequentially display pagewise images.

In the above projector, the source file supplying device may further comprise: an operation information generator for detecting operation of the pointing device by a user and generating operation information on the basis of detection results. The operation information generator, upon supply of the source file to the memory by the source file supplying section, may provide a display of an operation information generation area which is used in generating operation information due to operation of the pointing device. Then, the operation information generator may generate the operation information due to operation of the pointing device only when a pointer image associated with the pointing device is displayed within the operation information generation area, and supply the operation information to the page image processor. And the page image processor may prepare the page image data using the supplied source file, synthesize the page image data and embellishment image data on the basis of the operation information, and superimpose an embellishment image represented by the embellishment image data on a predetermined location in a page image represented by the page image data. By so doing, the page image processor can easily superimpose, on the basis of operation information, an embellishment image in a page image prepared using a source file.

In the above projector, the page image processor may automatically initiate processing according to the scenario information of the source file when the source file is supplied to the memory.

The seventh aspect of the present invention is directed to a method, which is a scenario creating method for creating a scenario file for pagewise sequential display of images in a scenario creating device comprising an input section including a pointing device, and a display section. The method comprises the steps of: (a) providing a display of a scenario file creation area on the display section, the scenario file creation area including a file management area for displaying source files and a selected source file information area for displaying, in a sequence selected by a user, selected source file information representing information of a source file selected by the user in the file management area; and (b) creating the scenario file in response to a content of the display in the selected source file information area.

The method herein affords functions and advantages similar to those derived from use of the scenario creating device herein, and it is possible to easily create a scenario file simply by display of selected source file information in the selected source file information area in a desired sequence. Also, by supplying a scenario file created in this way to a projector or other scenario reproducing device, it is possible for pagewise images to be easily sequentially displayed.

The eighth aspect of the present invention is directed to a storage medium, which is a computer-readable storage medium storing a computer program for creating a scenario file for pagewise sequential display of images in a scenario creating device comprising an input section including a pointing device, and a display section. The computer-readable storage medium comprises the computer program for causing a computer to implement the functions of: providing a display of a scenario file creation area on the display section, the scenario file creation area including a file management area for displaying source files and a selected source file information area for displaying, in a sequence selected by a user, selected source file information representing information of a source file selected by the user in the file management area; and creating the scenario file in response to a content of the display in the selected source file information area.

By executing by means of a scenario creating device a computer program stored in this storage device, in a manner similar to the method of the invention, a scenario file may be created easily simply by displaying selected source file information in the selected source file information area in a desired sequence. Also, by supplying a scenario file created in this way to a projector or other scenario reproducing device, it is possible for pagewise images to be easily sequentially displayed.

It should be noted that the above mentioned invention may be implemented through various embodiments such as a computer program for implementing at least one function among the function of a scenario creating device and the function of a scenario reproducing device (projector); a storage medium storing that computer program; a data signal containing that computer program embodied in a carrier wave, etc.

The ninth aspect of the present invention is directed to a device, which is an image display system wherein a file server storing a data file, a projector, and a computer are interconnected via a network. Here, the computer comprises: input means for inputting data and commands; data file storage means for storing a data file for display by the projector; transfer request determination means for determining whether a request for transfer of a desired data file from the data file storage means to the file server has occurred via the input means; index file generating means for generating an index file that includes transfer destination information of the data file and has smaller file size than that of the data file, when it is determined that a transfer request for the data file has occurred; and transferring means for transferring the data file and the index file to the file server and the projector, respectively. And, the projector comprises: index file storage means for receiving and storing the transferred index file; decision screen generating means for generating a data file decision screen for deciding a data file desired to be displayed using an index file stored in the index file storage device; transfer requesting means for indicating the file server on the basis of transfer destination information included in the index file associated with the data file decided via the data file decision screen, and requesting transfer of the data file; and projection display means for receiving and projection displaying the transfer requested data file.

According to this image display system, there is no need for a storage device of large memory capacity in the projector with regard to transferring data files, and data files can be reproduced independently by the projector. Also, without awareness of the network, by means of remote operation data file can be transferred and data file can be reproduced.

In the above image display system, the transfer destination information may include the transfer location and file name of the data file. The index file may include password information in addition to the transfer destination information. By providing this arrangement, the convenience of an index file can be improved. Also, the transfer request means of the projector may further request entry of a password, and when the entered password matches the password information, request the file server for transfer of the decided data file. By providing this arrangement, improper access of data files by a third party can be prevented.

In the above image display system, the computer may further comprise: a display screen device for displaying a list of data files stored in the data file storage means and an icon for the projector. The transfer request determination means may determine that a transfer request has occurred, when the icon for the desired data file from the list of stored data files is dragged and dropped on the icon for the projector in the display screen of the display screen device. By providing this arrangement, it is possible for data file transfer operations to be performed visually, so that data file transfer operations can be simplified.

The tenth aspect of the present invention is directed to a method, which is a method for transferring a data file generated by a computer. The method comprises the steps of: deciding a data file for transfer; determining whether a transfer request for the decided data file has occurred; generating an index file that includes storage location information of the decided data file and has smaller file size than that of the data file, when it is determined that a transfer request for the decided data file has occurred; transferring the decided data file to a storage ice as a storage destination; and transferring the index file to a projector.

With this data file transfer method, data files can be transferred without the need for a storage device of large memory capacity in the projector.

The data file transfer method pertaining to the tenth aspect of the present invention, like the ninth aspect of the present invention, permits of various modifications and improvements.

The eleventh aspect of the present invention is directed to a method, which is a method for displaying a data file in a projector on the basis of an index file that includes storage location information for the data file and has smaller file size than that of the data file. The method comprises the steps of: deciding a data file desired to be displayed using the index file; indicating the storage location of the decided data file on the basis of the corresponding index file; requesting transfer of the decided data file to a storage destination having the indicated storage location; and receiving and projection displaying the decided data file.

According to this data file display method, data files of large file size can be handled without dependence on the memory capacity of the storage device in the projector. Also, the storage locations (storage destinations) of data files are indicated using an index file, so by means of remote operation, transferring and display processing of data file can be executed without awareness of the network.

The data file display method pertaining to the eleventh aspect of the present invention, like the ninth aspect of the present invention, permits of various modifications and improvements.

The twelfth aspect of the present invention is directed to a device, which is a projector for acquiring a data file for display via a network from a file server storing data files. The projector comprises: input means for inputting data and commands; index file storage means for storing an index file that includes storage location information for the data file and has smaller file size than that of the data file; selection screen generating means for generating a selection screen for a data file associated with the index file; transfer requesting means for indicating the storage location of a selected data file using storage location information in the index file corresponding to the data file selected via the selection screen, and requesting transfer of the selected data file; and projection display means for projection displaying of the selected data file acquired via the network.

According to this projector, data files of large file size can be handled without dependence on the memory capacity of the storage device in the projector. Also, the storage destinations of data files are indicated using an index file, so by means of remote operation, transferring and display processing of data file can be executed without awareness of the network.

The thirteenth aspect of the present invention is directed to a device for transferring a data file via a network having connected projector and file server. The device comprises: input means for inputting data and commands; data file storage means for storing the data file; transfer request determination means for determining if there has been input a transfer request for a desired data file among data files stored in the data file storage means via the input means; reference file generating means for generating a reference file that includes storage location information for the desired data file and has smaller file size than that of the file, when it is determined that a transfer request has been input; and transferring means for transferring the desired data file and the reference file to the file server and the projector, respectively.

According to this data file transfer device, data files of large file size can be transferred irrespective of the memory capacity of the storage device in the projector. Also, as the storage destinations of data files can be indicated by an index file, by transferring the index file to the projector, data files can be operated through a sense similar to that where data files have been transferred to the projector.

The data file transfer device pertaining to the thirteenth aspect of the present invention, like the ninth aspect of the present invention, permits of various modifications and improvements.

The fourteenth aspect of the present invention is directed to a storage medium, which is a computer-readable storage medium storing a program executed on a computer, for transferring a data file generated by the computer. The program comprises the steps of: deciding a data file for transfer; determining whether a transfer request for the decided data file has occurred; generating an index file that includes storage location information of the decided data file and has smaller file size than that of the data file, when it is determined that a transfer request for the decided data file has occurred; transferring the decided data file to a storage device as a storage destination; and transferring the index file to a projector.

The computer-readable medium herein affords functions and advantages similar to those of the tenth aspect of the present invention.

The fifteenth aspect of the present invention is directed to a device, which is a computer-readable storage medium storing a program for displaying in a projector a data file on the basis of an index file that includes storage location information for the data file and has smaller file size than that of the data file. The program comprises the steps of deciding a data file desired to be displayed using the index file; deciding the storage location of the decided data file on the basis of the corresponding index file; requesting transfer of the decided data file to a storage destination having the decided storage location; and receiving and projection displaying the decided data file.

The computer-readable medium herein affords functions and advantages similar to those of the eleventh aspect of the present invention.

In the aspects of the present invention mentioned above, storage locations are unique storage locations at which data files are stored, and data files may be indicated (identified) by indicating storage locations on the basis of storage location information.

BRIEF DESCRIPTION OF THE DRAWINGS

FIG. 7 is an illustrative diagram showing an example of content of a scenario file supplied to projector PJ1;

FIG. 14 is an illustrative diagram showing an example of content of a scenario file supplied to projector PJ2;

FIGS. 21(A-1)-21(A-3) and 21(B-1)-21(B-3) are illustrative diagrams of the process when superimposing a box image PB in a page image ORG using a pointer image PPJ in page ORG;

DETAILED DESCRIPTION OF EMBODIMENTS

A. First Embodiment

Figure 1:
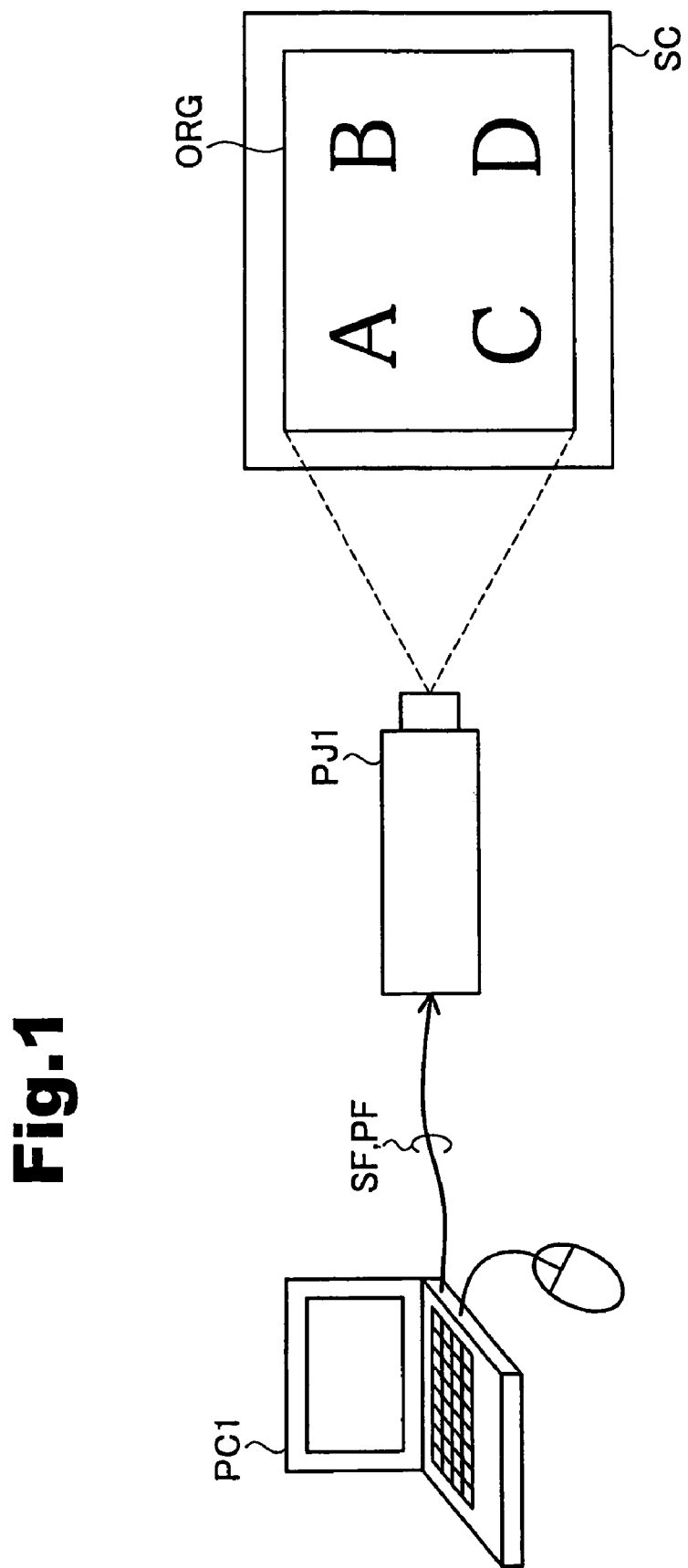
FIG. 1 is an illustrative diagram showing a scenario creating/reproducing system embodying the present invention.

A mode of the invention will be described on the basis of an embodiment. FIG. 1 is an illustrative diagram showing a scenario creating/reproducing system embodying the present invention. This scenario creating/reproducing system comprises a computer PC1 functioning as a scenario creating device and a scenario supplying device; and a projector (i.e. a projection type display device) PJ1 functioning as a scenario reproducing device. Computer PC1 and projector PJ1 are connected by a USB cable.

The projector PJ1 of this embodiment can reproduce image files of predetermined format according to a scenario file. However, the image file format reproducible by projector PJ1 is only a single format. Thus, the computer PC1 of this embodiment creates a scenario file SF and a predetermined format image file PF, and supplies these to projector PJ1. Projector PJ1, according to the supplied scenario file SF, displays on a screen SC a page image ORG corresponding to the predetermined format image file PF.

Figure 2:
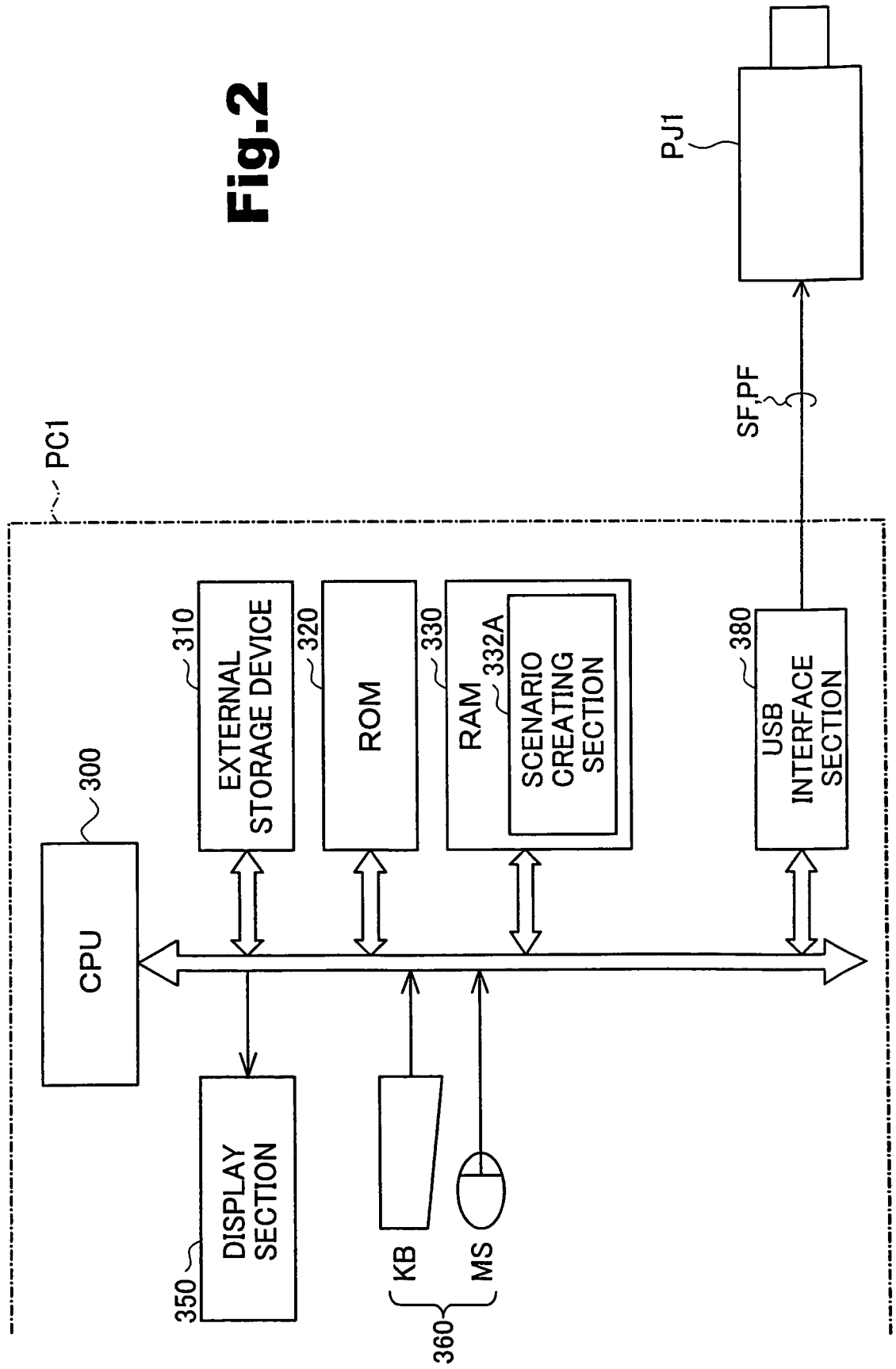
FIG. 2 is an illustrative diagram showing a simplified arrangement of computer PC1 of FIG. 1.

FIG. 2 is an illustrative diagram showing a simplified arrangement of computer PC1 of FIG. 1. Computer PC1 comprises a CPU 300, an external storage device 310, a ROM 320, a RAM 330, a display section 350, an input section 360 such as a mouse MS and keyboard KB, and a USB interface section 380.

RAM 330 stores a scenario creating program implementing the function of a scenario creating section 332A. Scenario creating section 332A has the function of creating a scenario file SF for pagewise sequential display, and image files PF used at the time of scenario reproduction. However, since the projector PJ1 of this embodiment can only reproduce image files PF of predetermined format according to scenario file SF, scenario creating section 332A generates image files PF of predetermined format. Also, scenario creating section 332A has the function of supplying the created scenario file SF and image files PF to projector PJ1 via USB interface section 380. That is, scenario creating section 332A and USB interface section 380 functions as a scenario supplying section for supplying scenario file SF to projector PJ1.

The computer program implementing the function of the abovementioned scenario creating section 332A is provided in a form stored on a computer-readable storage medium such as a flexible disk, CD-ROM etc. The computer reads out the computer program from the storage medium and transfers it to an internal storage device or external storage device. Or, a computer program may be supplied to the computer via a communications path. At the time of implementing the function of the computer program, the computer program stored in an internal storage device is executed by the microprocessor of the computer. Also, the computer program stored on the storage medium may be read out and directly executed by the computer.

In this specification, computer is a general concept including hardware devices and an operating system, and it means hardware devices that operate under control of the operating system. Also, where an operating system is unnecessary and hardware devices can be operated independently by an application program, those hardware devices correspond to a computer. Hardware devices comprise at least a CPU or other microprocessor, and means for reading out a computer program stored on a storage medium. The computer program includes program code for implementing the functions of each of the above-described means on this kind of computer. Further, some of the above-described functions may be implemented not by an application program but by the operating system.

As the "storage medium" in the present invention, there may be used a flexible disk, CD-ROM, DVD, magneto-optical disk, IC card, ROM cartridge, punch card, printed matter imprinted with symbols such as a bar code, etc., computer internal storage devices (RAM, ROM or other memory), external storage devices, and various other storage media readable by a computer.

Figure 3:
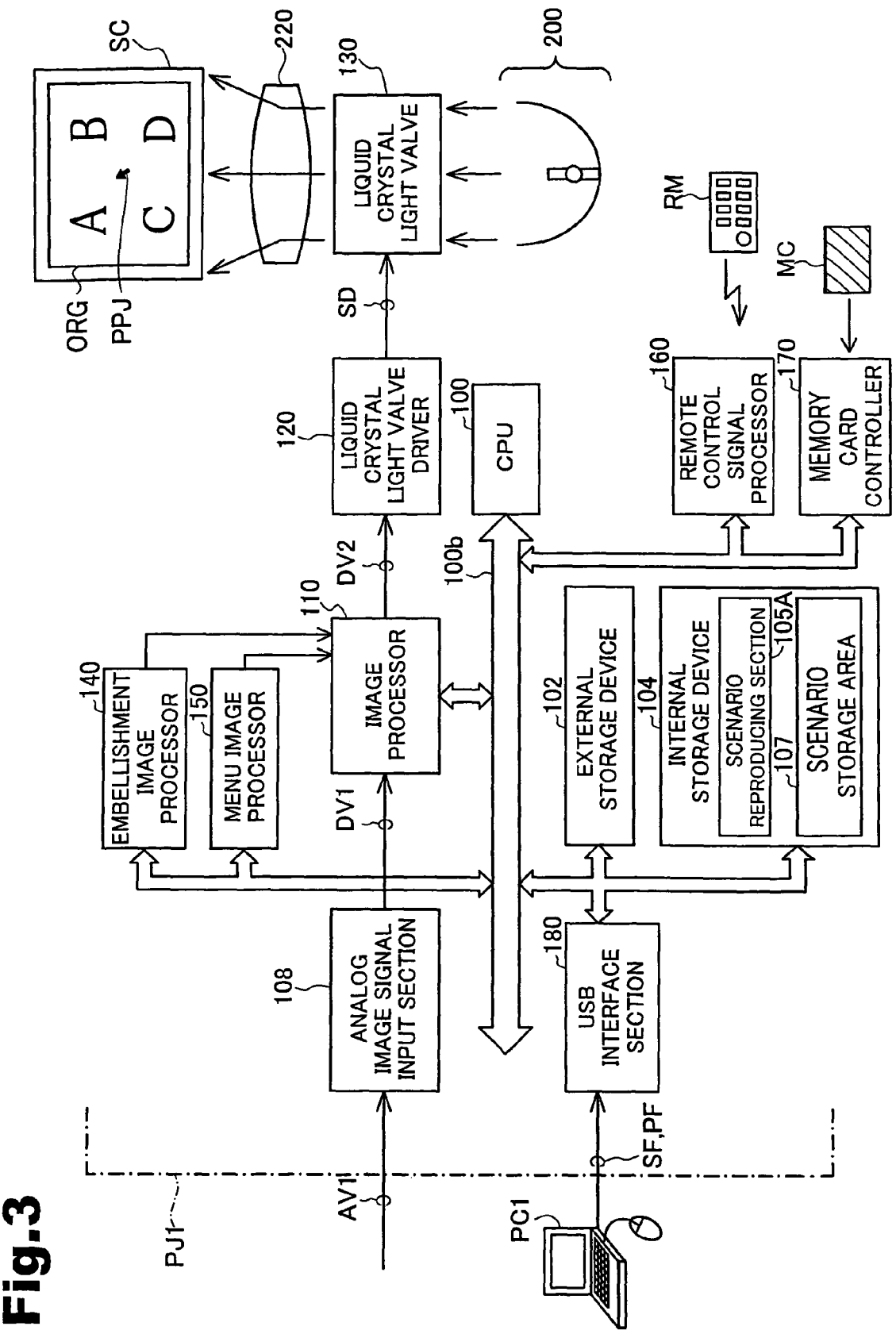
FIG. 3 is an illustrative diagram showing a simplified arrangement of projector PJ1 of FIG. 1.

FIG. 3 is an illustrative diagram showing a simplified arrangement of projection type display device, i.e. projector PJ1 of FIG. 1. Projector PJ1 comprises a CPU 100, an external storage device 102, an internal storage device 104 such as ROM or RAM, an analog image signal input section 108, an image processor 110, a liquid crystal light valve driver 120, a liquid crystal light valve 130, an embellishment image processor 140, a menu image processor 150, a remote control signal processor 160, a memory card controller 170 for reading out an image file etc. stored on a memory card MC, and a USB interface section 180. Liquid crystal light valve 130 is substantially evenly illuminated by an illuminating optical system 200, and image light formed in liquid crystal light valve 130 is projected by a projection optical system 220 onto a screen SC. In FIG. 3, depiction of optical systems 200, 220 is simplified.

Analog image signal input 108 has a function of AD conversion of analog image signal AV1 which is supplied from an external image supplying device (not shown), and outputting a digital image signal DV1. The analog image signal AV1 may be an RGB signal representing a computer image supplied from a personal computer, a composite image signal representing video supplied from a video recorder or television receiver, or other such image signals.

Image processor 110 has a function of generating synthesized image data synthesized from supplied original image data and embellishment image data. This process will provide on the screen SC a display of an original image ORG represented by the original image data with a superimposed embellishment image, such as a pointer image PPJ, represented by the embellishment image data. Image processor 110 temporarily writes supplied original image data into a frame memory (not shown) and, when reading the original image data from the frame memory, synthesizes the original image data and embellishment image data, and supplies the synthesized image data DV2 to liquid crystal light valve driver 120.

The original image data may be selected from image data DV1 supplied from analog image signal input section 108, pagewise page image data supplied from internal storage device 104, menu image data supplied from menu image processor 150, and image data read from a memory card MC and supplied from memory card controller 170. The embellishment image data is supplied from embellishment image processor 140. Here, the embellishment image means an image prepared independently of the original image, and displayed on screen SC by superimposition within the original image.

Liquid crystal light valve driver 120 generates image display data SD in response to image data DV2 supplied from image processor 110. Liquid crystal light valve 130 is driven by the image display data SD. The liquid crystal light valve 130 modulates light from illuminating optical system 200 and forms image light representing an image.

Embellishment image processor 140 has the function of generating embellishment image data representing an embellishment image and supplying it to image processor 110. Specifically, embellishment image processor 140 generates embellishment image data of various kinds, such as pointer image data representing a pointer image PPJ, an image of predetermined shape (such as a pointing image) created to a desired size by means of range specification using a pointer image PPJ, or a drawn image (for example, a box image or border frame image), and supplies it to image processor 110.

Menu image processor 150 has the function of generating menu image data representing a menu image and supplying it to image processor 110. The user can follow the menu image to perform various settings relating to projector PJ1.

USB interface section 180 has the function of receiving a scenario file SF and image files PF supplied from computer PC1 and supplying them to internal storage device 104 via a bus 100b.

Internal storage device 104 comprises a scenario reproducing section 105A for reproducing a scenario file SF, and a scenario storage area 107 for storing the supplied scenario file SF and image files PF. Scenario reproducing section 105A reads out the image files PF according to the scenario file SF and supplies pagewise image data as original image data to image processor 10. However, scenario reproducing section 105A of this embodiment can read image files of only one predetermined format which is different from the format of the source file.

In this embodiment the scenario file SF and the image files PF supplied from USB interface section 180 are stored in scenario storage area 107 in internal storage device 104, but could instead be stored in external storage device 102 or memory card MC inserted in memory card controller 170. Also, without using USB interface section 180, scenario files SF and image files PF may be written to a memory card MC in computer PC1. In this case, a memory card MC should be inserted into memory card controller 170 so that scenario files SF and image files PF may be read from the memory card MC.

Remote control signal processor 160 controls the functions of various sections of projector PJ1 on the basis of control signals from a remote controller RM. For example, remote control signal processor 160 can control the function of embellishment image processor 140 on the basis of control signals from a remote controller RM to superimpose a pointer image PPJ at a desired location in an original image ORG.

Figure 4:
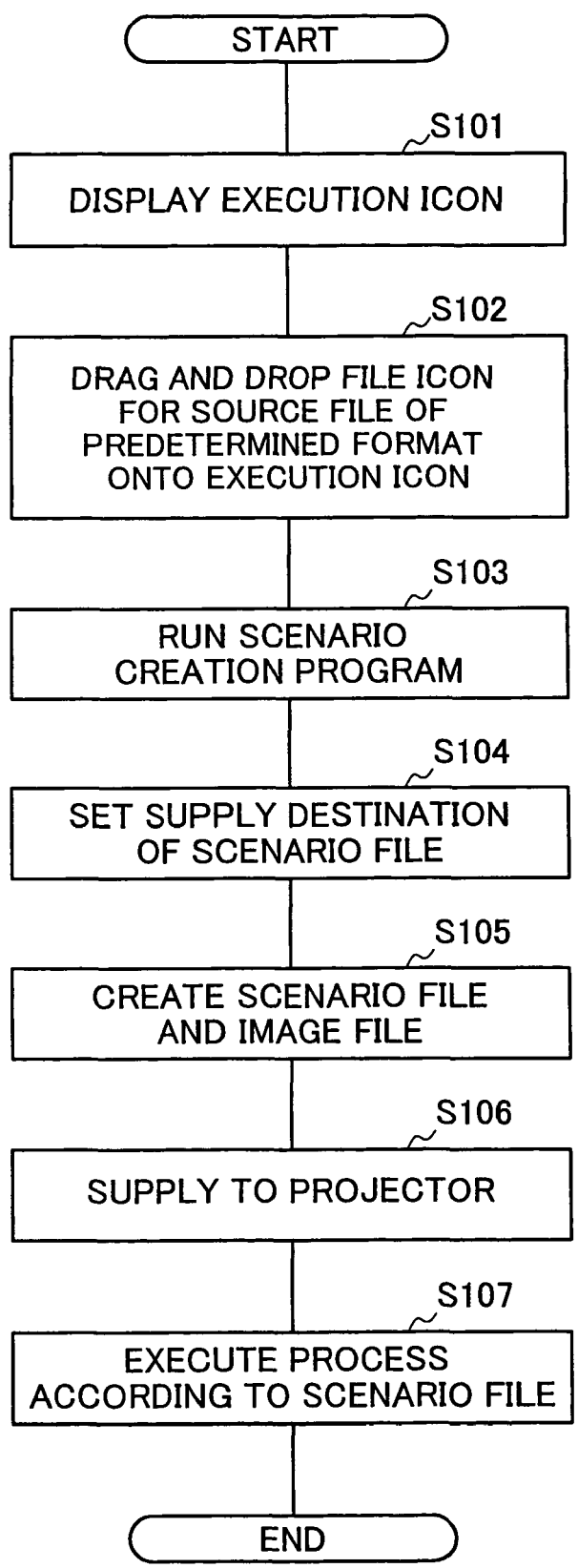
FIG. 4 is a flow chart showing a series of processes in the scenario creating/reproducing system of FIG. 1.

FIG. 4 is a flow chart showing a series of processes in the scenario creating/reproducing system of FIG. 1. It should be noted that Steps S101-S106 show processes of computer PC1, and Step S107 shows a process of projector PJ1.

Figure 5:
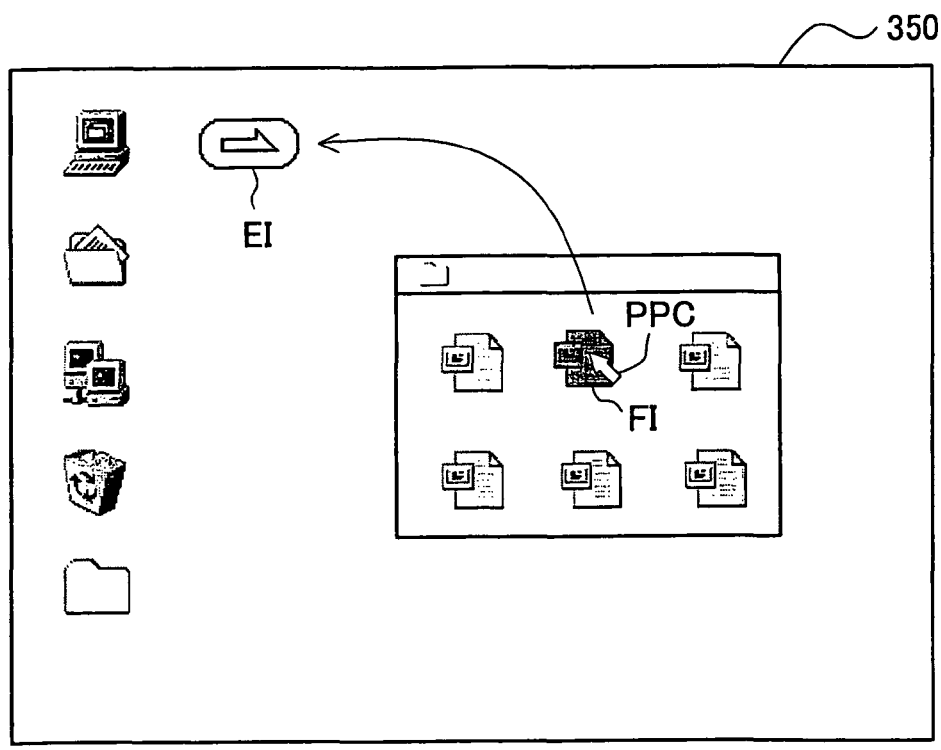
FIG. 5 is an illustrative diagram showing a desktop screen displayed on display section 350.

In Step S101, an execution icon for causing processing to be executed by scenario creating section 332A is displayed on display section 350 (FIG. 2) of computer PC1. FIG. 5 is an illustrative diagram showing a desktop screen displayed on display section 350. As depicted, the desktop screen includes an execution icon EI for causing processing to be executed by scenario creating section 332A.

In Step S102, the user operates the mouse MS (FIG. 2) of input section 360 to drag and drop a file icon FI of a source file of predetermined format on the execution icon EI, as shown in FIG. 5.

Here, the source file of predetermined format means a file that includes pagewise scenario information and image information, and in the present embodiment is assumed to be a PPT format file (hereinafter "PPT file") created using PowerPoint (trademark of Microsoft Corp.).

Drag and drop process means a process of placing the mouse pointer over an icon and dragging it, and then placing the icon over another icon and dropping it. Specifically, the drag and drop process in Step S102 means the following series of processes. That is, the mouse pointer PPC is placed over the file icon FI displayed on display section 305, a switch provided to mouse MS is pressed, and while continuing to hold it the mouse MS is moved to move the file icon FI (drag process). Then, the file icon FI is placed over the execution icon EI and the mouse MS switch is released (drop process).

In Step S103, the scenario creation program is run by the drag and drop process of Step S102. At this time the program stored in external storage device 310 (FIG. 2) of computer PC1 is loaded into RAM 330 and functions as scenario creating section 332A.

In Step S104, scenario creating section 332A displays on display section 350 a dialog box (not shown) for setting the supply destination to which the created scenario file should be supplied. In this embodiment, the user sets as the supply destination for the scenario file the projector PJ1 (FIG. 2) which is connected via USB interface section 380.

In Step S105, scenario creating section 332A creates a scenario file SF on the basis of pagewise scenario information contained in the source file of predetermined format (PPT file) and creates image files of predetermined format on the basis of pagewise image information. Here, the image file of predetermined format means a file of a format suitable for the projector PJ1 which is the scenario reproducing device, and in this embodiment is assumed to be a JPEG format image file (hereinafter also called "JPEG file").

In Step S106, scenario creating section 332A supplies the scenario file SF and image files PF created in Step S105 to projector PJ1 via USB interface section 380. As noted, in this embodiment the scenario files SF and the image files PF are stored in scenario storage area 107 (FIG. 3) in the internal storage device 104 of projector PJ1.

Figure 6:
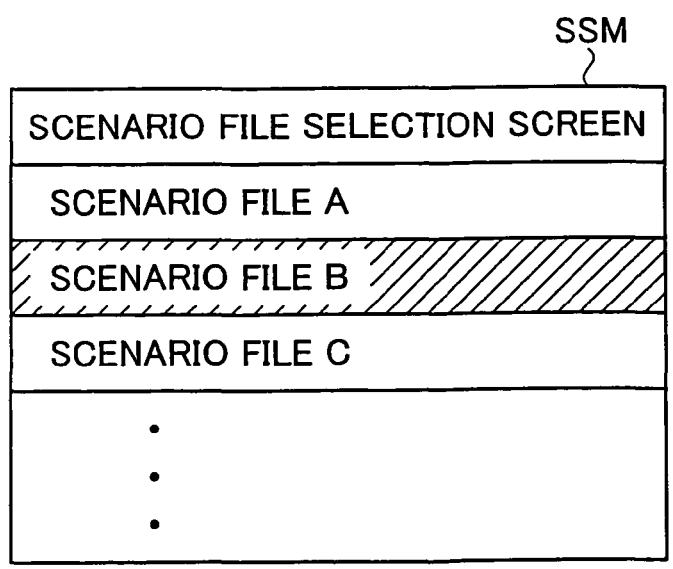
FIG. 6 is an illustrative diagram showing a scenario file selection screen SSM displayed by projector PJ1.

In Step S107, projector PJ1 executes a process according to the supplied scenario file SF. At this time, the user, using remote controller RM, displays a selection screen for selecting a desired scenario file from a plurality of scenario files stored in the internal storage device 104 of projector PJ1, and selects the desired scenario file. FIG. 6 is an illustrative diagram showing a scenario file selection screen SSM displayed by projector PJ1. It should be noted that this scenario file selection screen SSM is displayed on screen SC by means of the menu image processor 150, in response to a command from remote control signal processor 160, generating image data representing the scenario file selection screen and supplying it to image processor 110. The user selects the desired scenario file in scenario file selection screen SSM using the remote controller RM. In the scenario file selection screen SSM of FIG. 6, "Scenario File B" is selected.

When a scenario file has been selected in scenario file selection screen SSM, the scenario reproducing section 105A in internal storage device 104, in accordance with the scenario file SF in scenario storage area 107, sequentially reads out image files PF stored in scenario storage area 107 and provides pagewise page image data as original image data to image processor 110. The projector PJ1 is thus capable of pagewise sequential image projection onto screen SC.

It should be noted that, in this embodiment, processing in accordance with the scenario file is executed after a scenario file has been selected in scenario file selection screen SSM (FIG. 6), but it is also possible to have processing in accordance with scenario file SF executed simultaneously with supply of the scenario file SF and image files PF from computer PC1 CL to projector PJ1.

FIG. 7 is an illustrative diagram showing an example of the content of a scenario file supplied to projector PJ1. The symbols "L1" etc. appended to the right in FIG. 7 indicating line number for convenience of explanation, and are not included in the actual scenario file. The "begin" command in line number L1 and the "end" command in line number L17 are commands respectively signifying the beginning and end of processing in accordance with the scenario file, and in actual practice processing is executed in accordance with the commands of line numbers L2-L16.

The "Display" commands included in scenario file SF1 line numbers L2, L4, L6, L9, L11, L13 and L15 are commands to read out the subsequent JPEG file "Page1. jpg", "Page2.jpg", etc. and display the image. By means of the processes of line numbers L2, L4, L6, L9, L11, L13 and L15, pagewise images included in the source file (PPT file) selected in Step S102 (FIG. 4) are projected and displayed in page order.

The "Pause" commands included in scenario file SF1 line numbers L3, L5 and L8 are commands to maintain the preceding process until there is input from the user. For example, when an image is projected and displayed at line number L2, the image indicated in line number L2 is displayed until the user instructs transition to the next process by using the remote controller RM. This enables the user to perform pagewise changing of displayed images at a desired timing.

By the way, PowerPoint (trademark of Microsoft Corp.) is capable of combining each page image with audio and setting the display time for each page image. For this reason, the scenario information of the PPT file in some instances contains pagewise audio information and/or display time information. The scenario creating section 332A of this embodiment enables scenario files to be created in accordance with such scenario information. In cases where the PPT file contains audio data, the scenario creating section 332A creates an audio file and supplies it to projector PJ1.

The "Play" command included in line number L7 of the scenario file (FIG. 7) is a command created on the basis of audio information contained in the scenario information of the PPT file. The "Play" command is a command to read out the subsequent audio file "Wave1.wav" and reproduce the audio. This command will reproduce sound effects, narration and other audio together with display of images, enabling presentations to be carried out more effectively. Audio is output from a speaker (not shown) inside projector PJ1.

The "Wait" commands included in line numbers L10, L12, L14 and L16 of scenario file SF are commands created on the basis of display time information contained in the scenario information of the PPT file. The "Wait" command is a command to maintain the preceding process for an indicated time interval. For example, when an image is displayed at line number L9, after the image has been displayed for the "10000 msec" following the "Wait" command, the process proceeds to the next line number L11. By means of this, projected images can be automatically page-forwarded.

As noted above, in Step S107 projector PJ1 reads out supplied image files (JPEG files) in accordance with a scenario file SF such as that depicted in FIG. 7, and sequentially projects pagewise images.

As described hereinabove, the computer PC1 of this embodiment comprises a scenario creating section 332A, and functions as a scenario creating device. Scenario creating section 332A displays on display section 350 an execution icon EI for executing a process by scenario creating section 332A. When the file icon FI for a source file (PPT file) of prdetermined format containing pagewise scenario information and image information is dragged and dropped on the execution icon EI by means of operation of the mouse MS, the scenario creating section 332A generates scenario file SF on the basis of the scenario information and generates an image file (JPEG file) PF of predetermined format on the basis of the image formation.

With such a scenario creating device PC1, it is possible to easily create scenario files and predetermined format image files using source files of predetermined format. Also if such scenario files and predetermined format image files are supplied to a scenario reproducing device such as a projector PJ1 capable of reproducing only image files of a predetermined format, pagewise images can easily be displayed in sequence.

A1. Modification of First Embodiment

In the preceding embodiment, computer PCd comprises a mouse MS as the input section 360, but instead of a mouse MS there could be provided a tablet, trackball, track pad, joystick or other pointing device. These pointing devices have the same function as the mouse MS and correspond to the pointing device in the present invention.

In the preceding embodiment, a JPEG file was described as the image file of predetermined format reproduced by projector PJ1. However, instead of a JPEG file, it could be a GIF file or TIFF file. That is, image files having different formats than the source file format are acceptable.

B. Second Embodiment

Figure 8:
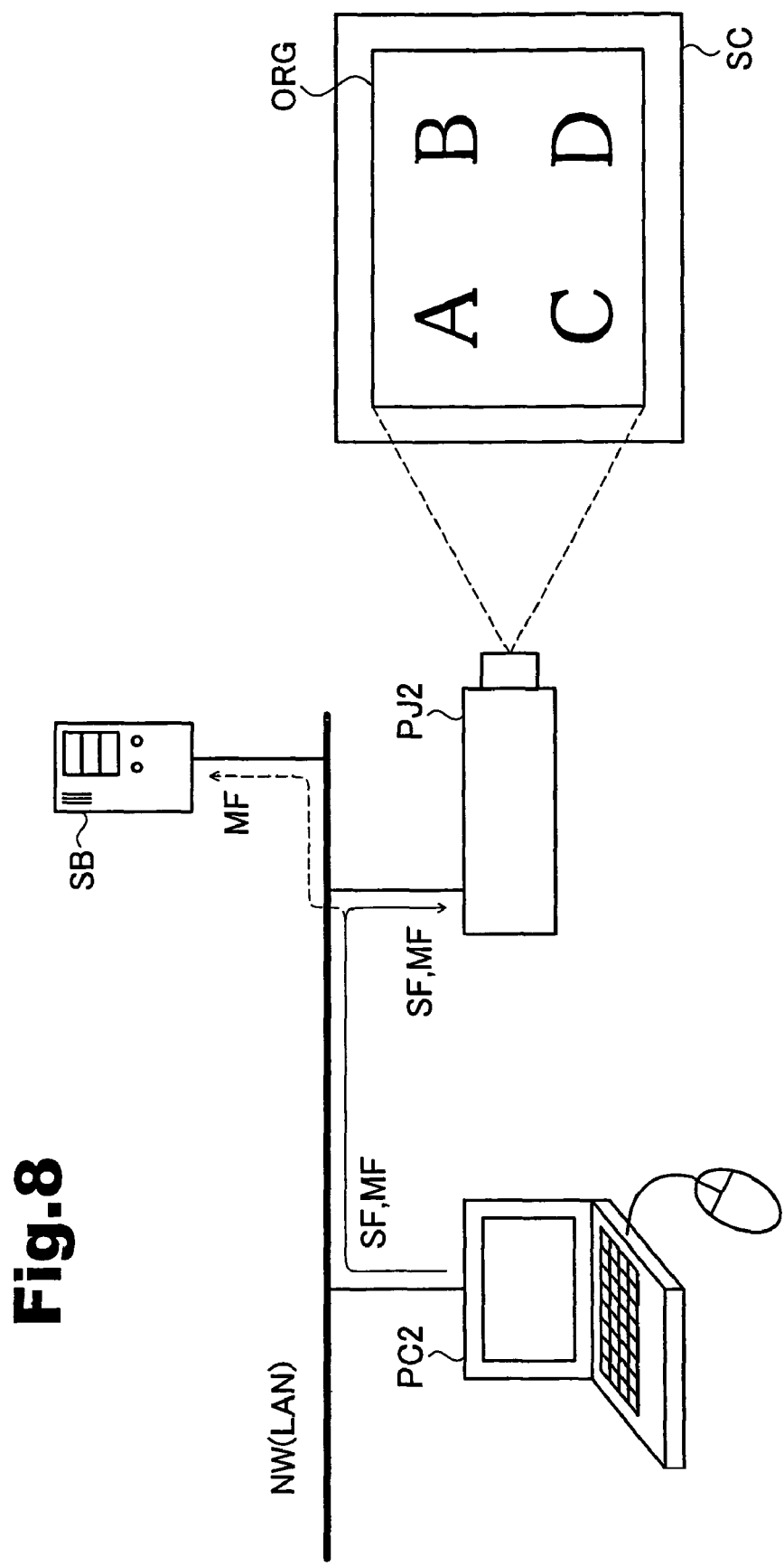
FIG. 8 is an illustrative diagram showing a scenario creating/reproducing system in a second embodiment.

Another mode of the invention will be described on the basis of an embodiment. FIG. 8 is an illustrative diagram showing a scenario creating/reproducing system in a second embodiment. This scenario creating/reproducing system comprises a computer PC2 functioning as a scenario creating device and a scenario supplying device; and a projection type display device, i.e. a projector PJ2 functioning as a scenario reproducing device. Computer PC1 and projector PJ1 are interconnected via a network NW. In this scenario creating/reproducing system a filer server SB is connected on the network NW. In this embodiment, the network NW is assumed to be a LAN.

The projector PJ2 of this embodiment can reproduce source files of a plurality of formats accordance to a scenario file. Thus, the computer PC2 of this embodiment creates only a scenario file SF and supplies it to projector PJ2. Further, source files MF stored in computer PC2 are supplied to and stored in projector PJ2 and file server SB. In accordance with a supplied scenario file SF, projector PJ2 reads out source files MF stored in projector PJ2 and file server SB, and displays page images ORG corresponding to source files MF on a screen SC.

In this description, "page" refers to a presentation sheet (slide) displayed individually on the basis of an indicated order. "Page image" means an image represented by a presentation sheet; each page image contains text, patterns, etc. A pagewise image displayed on screen SC etc. may be a whole image representing a single page image in its entirety, or a partial image representing a portion of a single page image.

Figure 9:
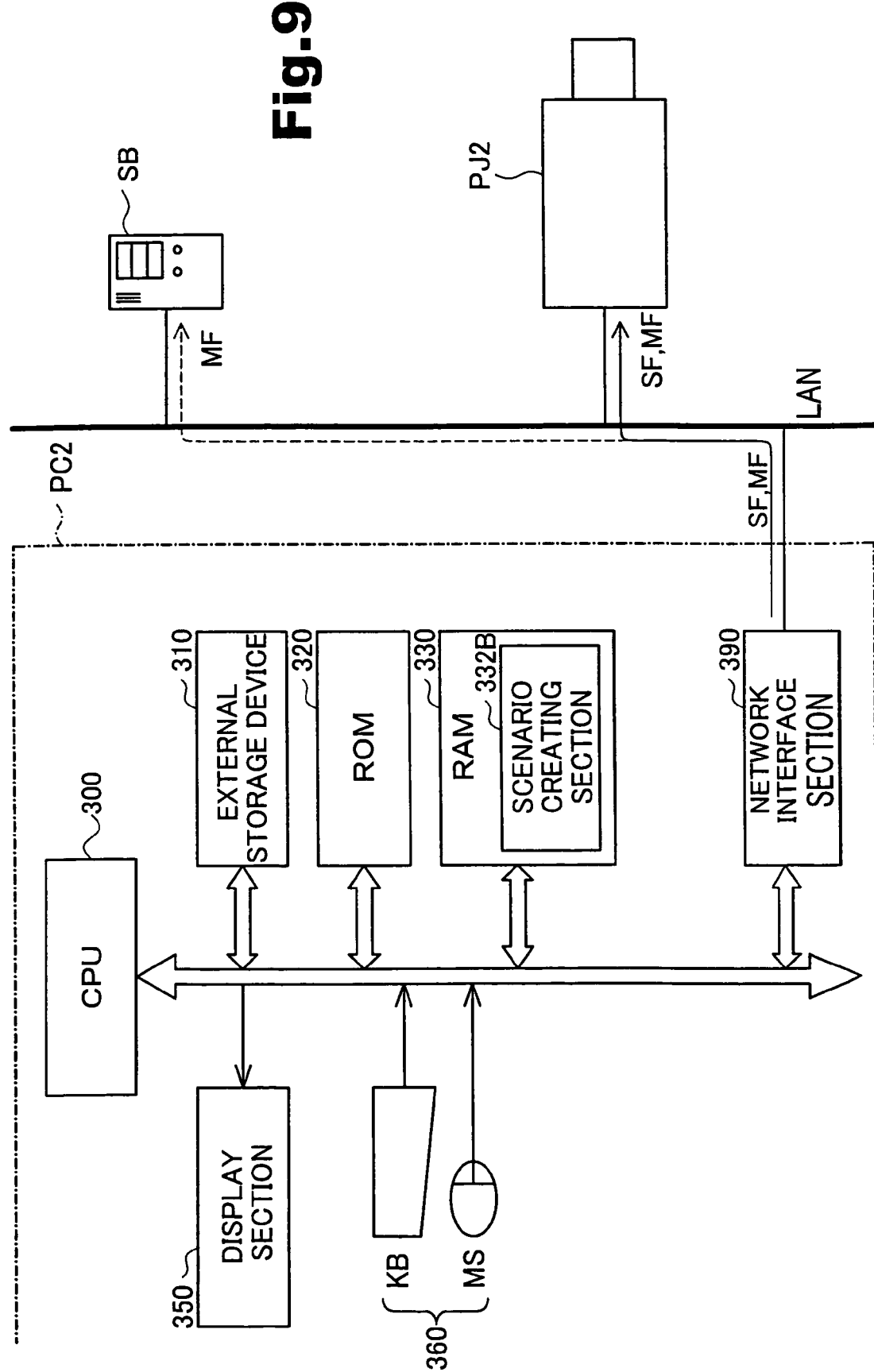
FIG. 9 is an illustrative diagram showing a simplified arrangement of computer PC2 of FIG. 8.

FIG. 9 is an illustrative diagram showing a simplified arrangement of computer PC2 of FIG. 8. Computer PC2 comprises a CPU 300, an external storage device 310, a ROM 320, a RAM 330, a display section 350, an input section 360 such as a mouse MS and keyboard KB, and a network interface section 390. Computer PC2 is connected to projector PJ2 via network interface section 390.

RAM 330 stores a scenario creating program implementing the function of scenario creating section 332B. Scenario creating section 332B has the function of combining a plurality of source files of multiple formats to create a scenario file SF.

Scenario creating section 332B also has the function of supplying the scenario file SF to projector PJ2 via network interface section 390. That is, the scenario creating section 332B and network interface section 390 of this embodiment have the function of a scenario supplying section for supplying a scenario file SF to projector PJ2. Further, scenario creating section 332B has the function of supplying source files MF to projector PJ2 and file server SB via network interface section 390.

The computer program implementing the function of the abovementioned scenario creating section 332B is provided in a form stored on a computer-readable storage medium such as a flexible disk, CD-ROM etc. The computer reads out the computer program from the storage medium and transfers it to an internal storage device or external storage device. Or, a computer program may be supplied to the computer via a communications path. At the time of implementing the function of the computer program, the computer program stored in an internal storage device is executed by the microprocessor of the computer. Also, the computer program stored on the storage medium may be read out and directly executed by the computer.

In this specification, computer is a general concept including hardware devices and an operating system, and it means hardware devices that operate under control of the operating system. Also, where an operating system is unnecessary and hardware devices can be operated independently by an application program, those hardware devices correspond to a computer. Hardware devices comprise at least a CPU or other microprocessor, and means for reading out a computer program stored on a storage medium. The computer program includes program code for implementing the functions of each of the above-described means on this kind of computer. Further, some of the above-described functions may be implemented not by an application program but by the operating system.

As the "storage medium" in the present invention, there may be used a flexible disk, CD-ROM, DVD, magneto-optical disk, IC card, ROM cartridge, punch card, printed matter imprinted with symbols such as a bar code, etc., computer internal storage devices (RAM, ROM or other memory), external storage devices, and various other storage media readable by a computer.

Figure 10:
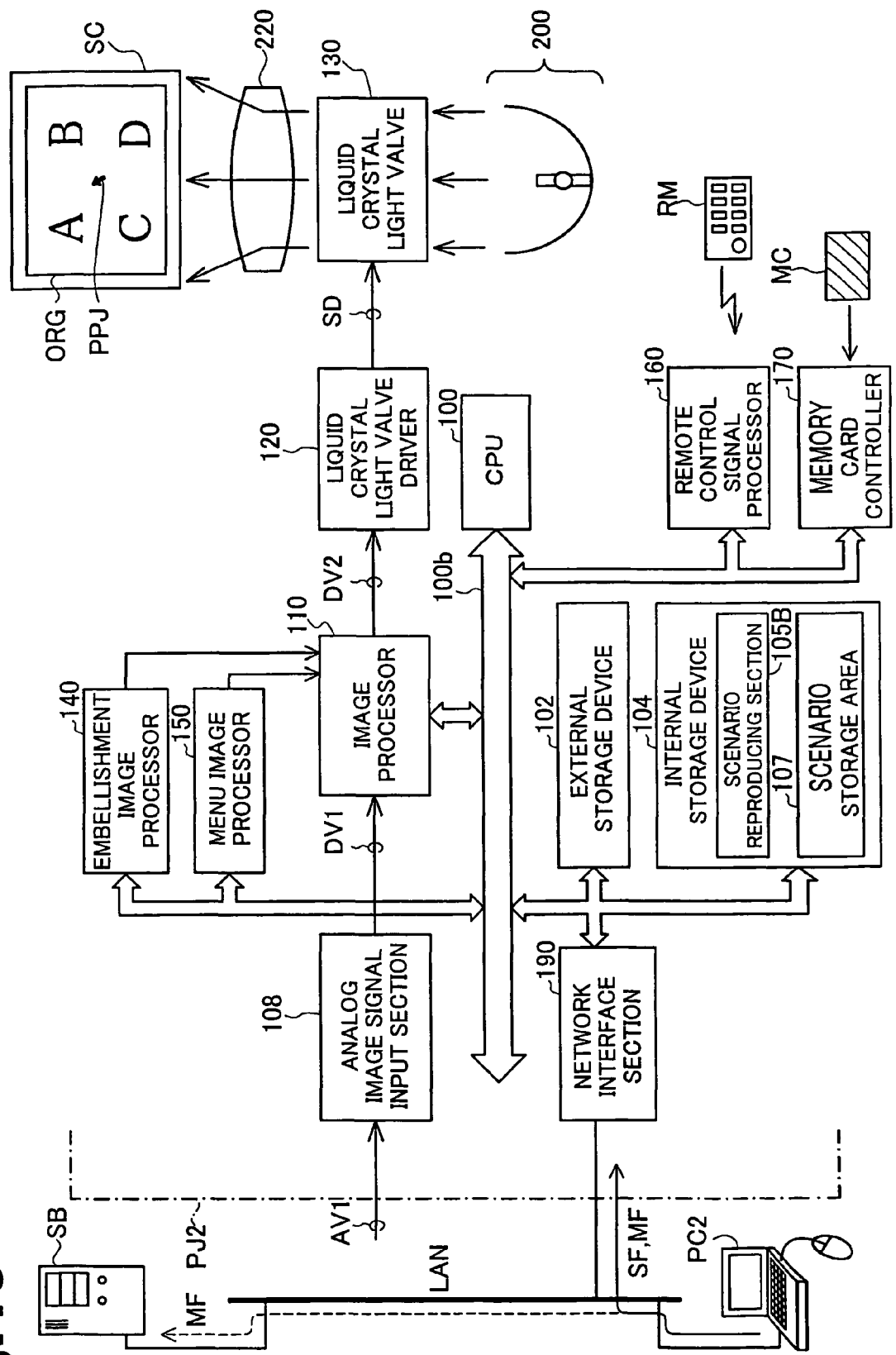
FIG. 10 is an illustrative diagram showing a simplified arrangement of projector PJ2 of FIG. 8.

FIG. 10 is an illustrative diagram showing a simplified arrangement of projector PJ2 of FIG. 8. Projector PJ2 comprises a CPU 100, an external storage device 102, an internal storage device 104 such as ROM or RAM, an analog image signal input section 108, an image processor 110, a liquid crystal light valve driver 120, a liquid crystal light valve 130, an embellishment image processor 140, a menu image processor 150, a remote control signal processor 160, a memory card controller 170 for reading out an image file etc. stored on a memory card MC, and a network interface section 190. Liquid crystal light valve 130 is substantially evenly illuminated by an illuminating optical system 200, and image light formed in liquid crystal light valve 130 is projected by a projection optical system 220 onto a screen SC. In FIG. 10, depiction of optical systems 200, 220 is simplified.

Analog image signal input section 108 has a function of AD conversion of analog image signal AV1 which is supplied from an external image supplying device (not shown), and outputting a digital image signal DV1. The analog image signal AV1 may be an RGB signal representing a computer image supplied from a personal computer, a composite image signal representing video supplied from a video recorder or television receiver, or other such image signals.

Image processor 110 has a function of generating synthesized image data synthesized from supplied original image data and embellishment image data. This process will provide on the screen SC a display of an original image ORG represented by the original image data with a superimposed embellishment image, such as a pointer image PPJ, represented by the embellishment image data. Image processor 110 temporarily writes supplied original image data into a frame memory (not shown) and, when reading the original image data from the frame memory, synthesizes the original image data and embellishment image data, and supplies the synthesized image data DV2 to liquid crystal light valve driver 120.

The original image data may be selected from image data DV1 supplied from analog image signal input section 108, pagewise page image data supplied from internal storage device 104, menu image data supplied from menu image processor 150, image data read from a memory card MC and supplied from memory card controller 170. The embellishment image data is supplied from embellishment image processor 140. Here, the embellishment image means an image (appended image) prepared independently of the original image, and displayed on screen SC by superimposition (appended) within the original image.

Liquid crystal light valve driver 120 generates image display data SD in response to image data DV2 supplied from image processor 110. Liquid crystal light valve 130 is driven by the image display data SD. The liquid crystal light valve 130 modulates light from illuminating optical system 200 and forms image light representing an image.

Embellishment image processor 140 has the function of generating embellishment image data representing an embellishment image and supplying it to image processor 110. Specifically, embellishment image processor 140 generates embellishment image data of various kinds, such as pointer image data representing a pointer image PPJ, an image of predetermined shape (such as a pointing image) created to a desired size by means of range specification using a pointer image PPJ, or a drawn image (for example, a box image or border frame image), and supplies it to image processor 110.

Menu image processor 150 has the function of generating menu image data representing a menu image and supplying it to image processor 110. The user can follow the menu image to perform various settings relating to projector PJ2.

Network interface section 190 has the function of connecting projector PJ2 to the LAN and receiving scenario files SF, or source files MF used in the scenario files SF, supplied from computer PC2 via the LAN, and supplying these to internal storage device 104 via a bus 100b.

Internal storage device 104 comprises a scenario reproducing section 105B for reproducing supplied scenario files SF, and a scenario storage area 107 for storing the supplied scenario files SF and source files MF supplied from network interface section 190.

In this embodiment the scenario files SF and source files MF supplied from network interface section 190 are stored in scenario storage area 107 in internal storage device 104, but could instead be stored in external storage device 102 or memory card MC inserted in memory card controller 170. Also, without using network interface section 190, scenario files SF and source files MF may be written to a memory card MC in computer PC2. In this case, a memory card MC should be inserted into memory card controller 170 so that scenario files SF and source files MF may be read from the memory card MC.

Scenario reproducing section 105B can read out source files MF of multiple formats created by a plurality of types of application programs. That is, scenario reproducing section 105B is provided with a viewer function allowing the contents of source files MF of multiple formats created by a plurality of types of application programs to be viewed. In accordance with a scenario file SF, scenario reproducing section 105B reads out source files MF stored in scenario storage area 107 or file server SB, and supplies pagewise page image data as original image data to image processor 110.

Remote control signal processor 160 controls the functions of various sections of projector PJ2 on the basis of control signals from a remote controller RM. For example, remote control signal processor 160 can control the function of embellishment image processor 140 on the basis of control signals from a remote controller RM to superimpose a pointer image PPJ at a desired location in an original image ORG.

As will be apparent from the preceding description, the CPU 100, image processor 110, and scenario reproducing section 105B of this embodiment correspond to the page image processor in the present invention.

Figure 11:
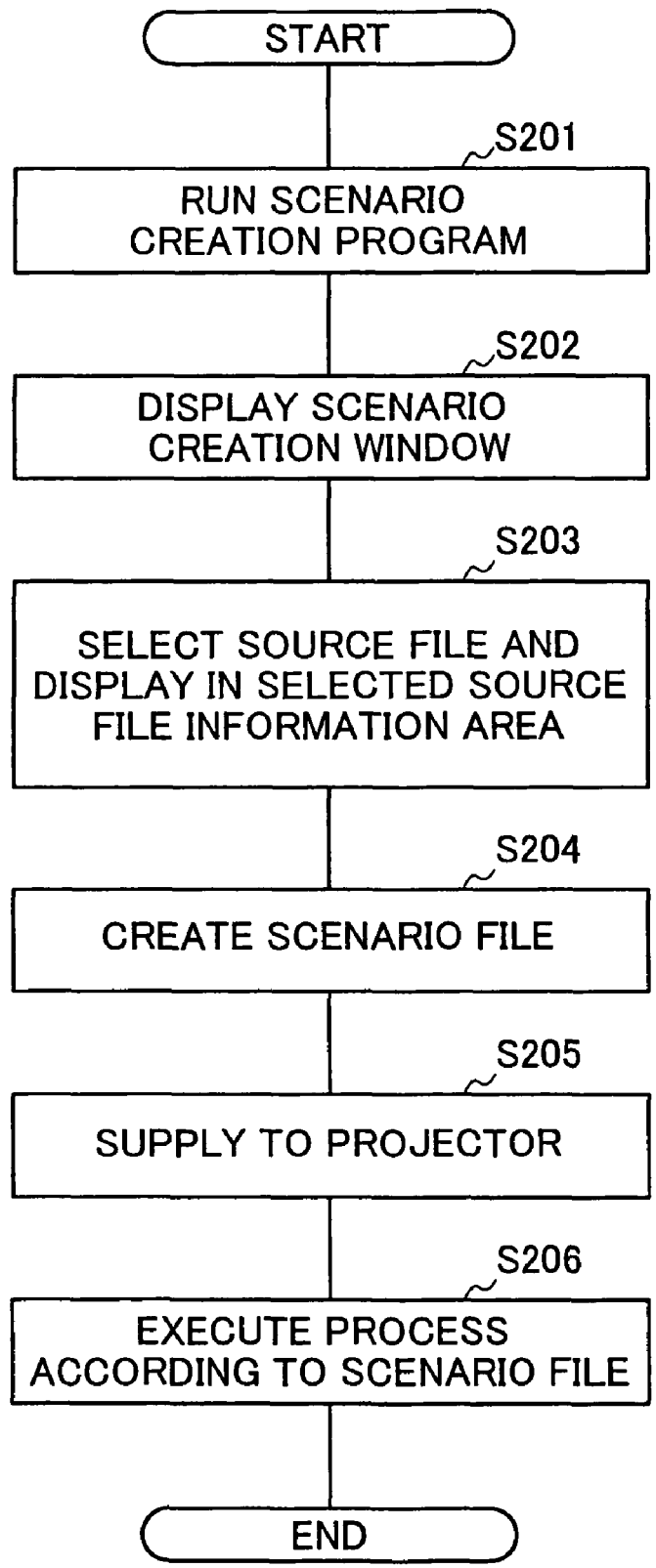
FIG. 11 is a flow chart showing a series of processes in the scenario creating/reproducing system of FIG. 8.

FIG. 11 is a flow chart showing a series of processes in the scenario creating/reproducing system of FIG. 8. It should be noted that Steps S201-S205 show processes of computer PC2, and Step S206 shows a process of projector PJ2.

In Step S201, an execution icon (not shown) for causing processing to be executed by scenario creating section 332B, displayed on display section 350 of computer PC2, is double-clicked with the mouse MS to run the scenario creating program. At this time, the program stored in external storage device 310 (FIG. 9) of computer PC2 is loaded into RAM 330 and functions as scenario creating section 332B.

In Step S202, scenario creating section 332B displays a scenario creation window on display section 350.

Figure 12:
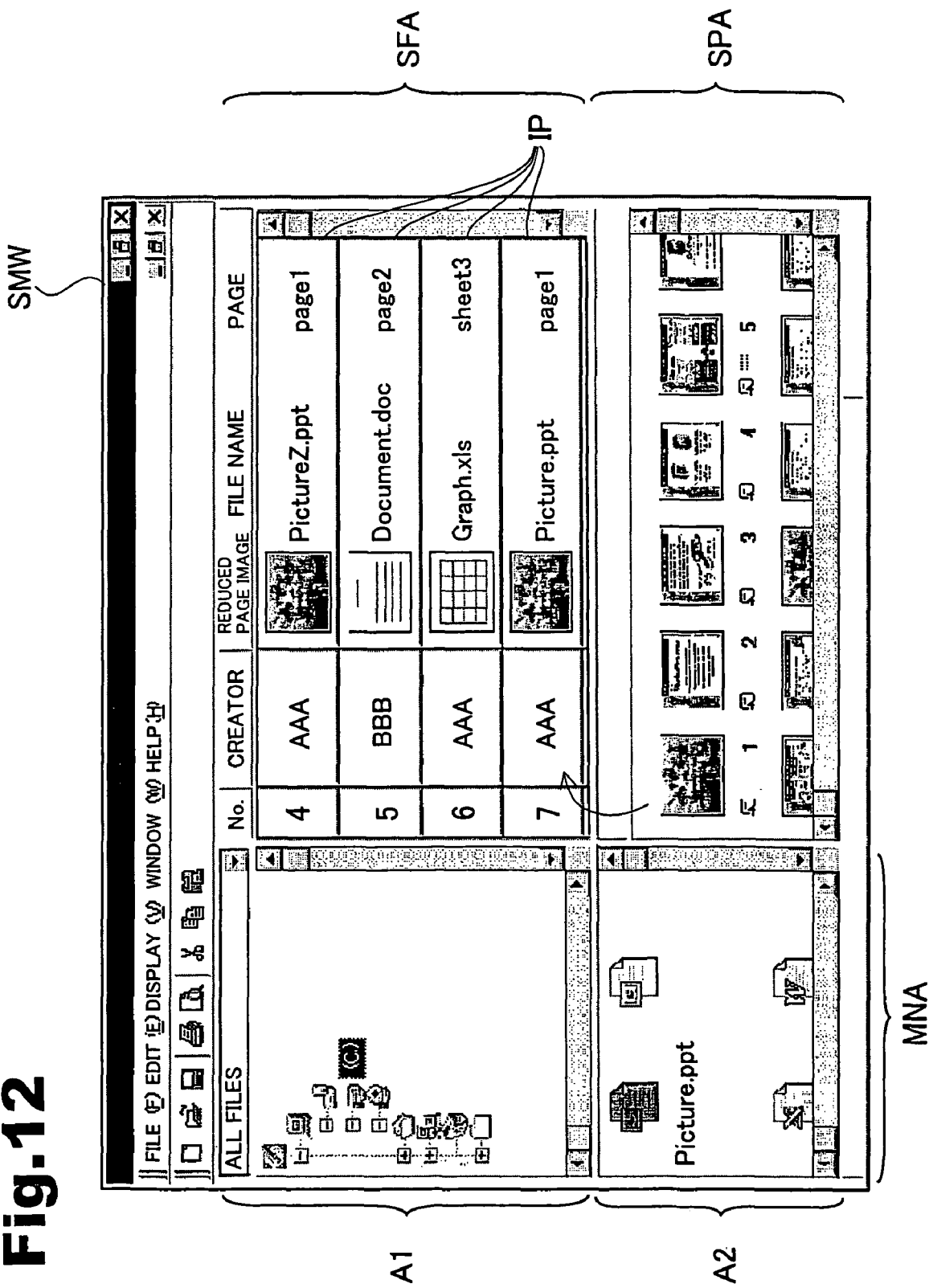
FIG. 12 is an illustrative diagram showing a scenario creation window SMW displayed on display section 350.

FIG. 12 is an illustrative diagram showing a scenario creation window SMW displayed on display section 350. As illustrated, the scenario creation window SMW includes a file management area MNA to the left side in the drawing, a reduced image display area SPA at the lower right, and a selected source file information area SFA at the upper right.

The file management area MNA comprises a folder area A1 showing folders that can be managed in a hierarchical structure, and a file area A2 showing files in folders indicated in folder area Al. The user can indicate in folder area A1 a folder in which a desired source file is stored, to display the file icon for the desired source file in file area A2.

It should be noted that this file management area MNA is capable of displaying file icons for source files stored in a file server SB connected to network NW, or in some other external device.

The reduced image display area SPA is an area for displaying pagewise image information as reduced pagewise images in the event that source files indicated in file management area MNA are source files of predetermined format that include pagewise scenario information and image information. In this embodiment, the abovementioned source file of predetermined format is assumed to be a PPT format file (hereinafter "PPT file") created using PowerPoint (trademark of Microsoft Corp.). By displaying a reduced image in this way, pagewise image content can be readily verified.

The selected source file information area SFA is an area for displaying source file information selected by the user (selected source file information), in an order indicated by the user. Scenario creating section 332B (FIG. 9) creates a scenario file in accordance with the displayed content in the selected source file information area SFA.

In Step S203 of FIG. 11, the user selects a source file, and the information of the selected source file (selected source file information) is displayed in selected source file information area SFA.

Specifically, the user, by operating the mouse MS, selects the file icon for a source file displayed in the file management area MNA, and drags and drops it into the selected source file information area SFA. By means of this, selected source file information associated with the source file selected by the user is displayed in the selected source file information area SFA.

Or, the user, by operating the mouse MS, selects a reduced pagewise image displayed in reduced image display area SPA and drags and drops it into the selected source file information area SFA. By means of this as well, selected source file information associated with the source file selected by the user is displayed in the selected source file information area SFA.

Here, drag and drop process means a process of placing the mouse pointer over an icon etc. and dragging it, and then placing the icon over another icon or area and dropping it. Specifically, the drag and drop process in Step S203 means the following series of processes. That is, the mouse pointer is placed over a file icon displayed in file management area MNA or a reduced image displayed in reduced image display area SPA, and while continuing to hold switch provided to mouse MS, mouse MS is moved to move the file icon or reduced image (drag process). Then, the file icon or reduced image is placed over the selected source file information area SFA, and the mouse MS switch is released (drop process).

It should be noted that selection of the abovementioned source file icon or reduced image may also be performed for a source file stored in a file server SB connected to network NW or in some other external device. By means of this, a source file stored in some other external device may be selected and a scenario file created.

Source file selection is also possible for multiple format source files. That is, the scenario creating section 332B of this embodiment can create scenario files using multiple format source files.

By the way, as shown in selected source file information area SFA of FIG. 12, each selected source file information includes the creator of the selected source file, the file name, page indicating information indicating the page in the source file, and a reduced page image representing the indicated page. Page indicating information is set when the user drags and drops a source file icon displayed in file management area MNA into selected source file information area SFA. That is, when the user drags and drops a source file icon into selected source file information area SFA, scenario creating section 332B causes a dialog box (not shown) to be displayed, and the user indicated the desired page in the dialog box. On the other hand, when the user drags and drops a reduced image displayed in reduced image display area SPA into selected source file information area SFA, the abovementioned dialog box is not displayed, and page indicating information is automatically included in the selected source file information.

In selected source file information area SFA, each selected source file information is displayed in the order indicated by-the user. The user can modify the lineup order of selected source file information in selected source file information area SFA. Modification of the lineup order is performed by dragging and dropping a strip-shaped information display image IP in which each selected source file information is displayed.

When the desired selected source file information is displayed in the desired order in selected source file information area SFA in this way, in Step S204 (FIG. 11), a scenario file is created. At this time, scenario creating section 332B creates a scenario file in accordance with display content in selected source file information area SFA.

In Step S205, the created scenario file SF is supplied to projector PJ2. In this embodiment, projector PJ2 connected via network NW is preset as the supply destination for scenario file SF. Specifically, the user brings up in scenario creation window SMW a settings screen (not shown) for setting the supply destination for scenario file SF, and sets the supply destination in the settings screen. Scenario creating section 332B supplies the created scenario file SF to projector PJ2 via network NW.

Also, scenario creating section 332B supplies a source file MF used in the scenario file SF to projector PJ2 and/or file server SB via network NW. Specifically, where a scenario file SF has been created using a source file MF stored in the external storage device 310 etc. of computer PC2, scenario creating section 332B supplies the source file MF stored in computer PC2 to projector PJ2 and file server SB. It should be noted that where source file MF is supplied to file server SB and not supplied to projector PJ2, there is the advantage that the memory capacity of external storage device 102 and internal storage device 104 of projector PJ2 can be relative small. Also, where scenario creating section 332B has crated a scenario file using a source file stored in file server SB, the source file stored in file server SB is not supplied to projector PJ2.

Figure 13:
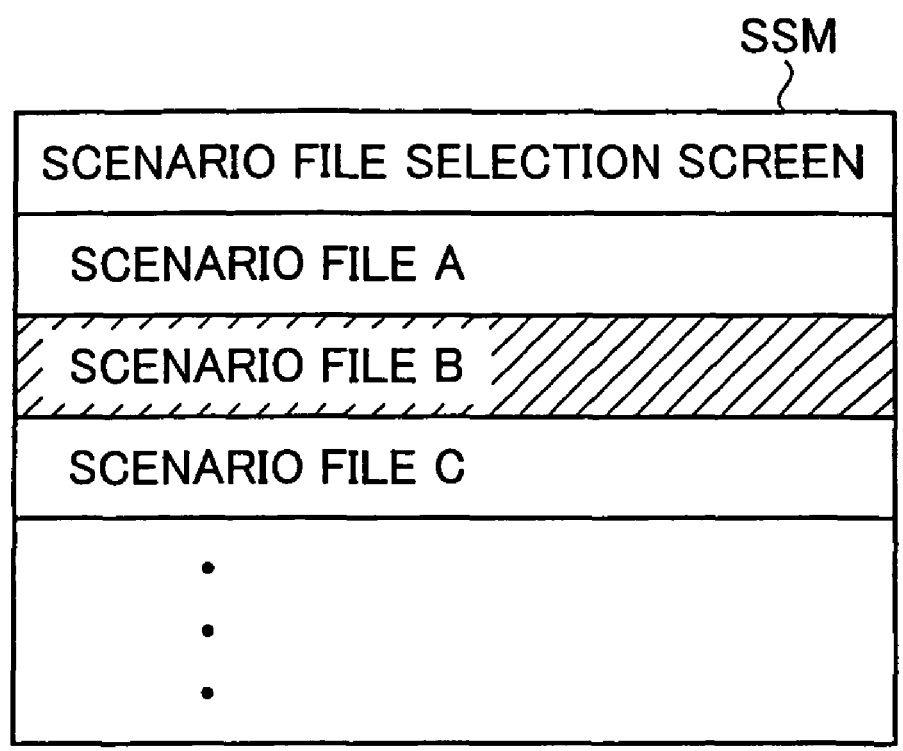
FIG. 13 is an illustrative diagram showing a scenario file selection screen SSM displayed by projector PJ2.

In Step S206, projector PJ2 executes a process according to the supplied scenario file SF. At this time, the user, using remote controller RM, displays a selection screen for selecting a desired scenario file from a plurality of scenario files stored in the internal storage device 104 etc. of projector PJ2, and selects the desired scenario file. FIG. 13 is an illustrative diagram showing a scenario file selection screen SSM displayed by projector PJ2. This scenario file selection screen SSM is displayed on screen SC by means of the menu image processor 150, in response to a command from remote control signal processor 160, generating image data representing the scenario file selection screen, and supplying it to image processor 110. The user selects the desired scenario file in scenario file selection screen SSM using the remote controller RM. In the scenario file selection screen SSM of FIG. 13, "Scenario File B" is selected.

When a scenario file has been selected in scenario file selection screen SSM, the scenario reproducing section 105B in internal storage device 104, in accordance with the selected scenario file SF in scenario storage area 107, reads out the source file MF and provides pagewise page image data as original image data to image processor 110. Source file MF is read out from the storage area indicated by scenario file SF. That is, where source file MF is stored in the scenario storage area 107 of projector PJ2, scenario reproducing section 105B reads out the source file from scenario storage area 107. Where source file MF is stored in the storage area of file server SB, scenario reproducing section 105B reads out the source file from file server SB. By means of this, projector PJ2 is capable of pagewise sequential projected display of images onto screen SC.

It should be noted that, in this embodiment, processing in accordance with the scenario file is executed after a scenario file has been selected in scenario file selection screen SSM (FIG. 13), but it is also possible to have processing in accordance with scenario file SF automatically executed simultaneously with supply of the scenario file SF from computer PC2 to projector PJ2.

FIG. 14 is an illustrative diagram showing an example of content of a scenario file supplied to projector PJ2. The symbols "L1" etc. appended to the right in FIG. 14 are convenient symbols representing line number, and are not included in the actual scenario file. The "begin" command in line number L1 and the "end" command in line number L16 are commands respectively signifying the beginning and end of processing in accordance with the scenario file, and in actual practice processing is executed in accordance with the commands of line numbers L2-L15.

The "Display" commands included in scenario file SF1 line numbers L2, L4, L6, L8, L10, L12 and L14 are commands to read out the subsequent source file and display the image. "Display" commands include path information representing the source file storage location (storage area), and page indicating information indicating a page in the source file. Thus, when a "Display" command is executed, only the relevant page in the source file stored in the predetermined storage area is extracted and read out. Also, as shown in FIG. 14, the scenario file of this embodiment is created by combining multiple format source files created by a plurality of application programs.

For example, projector PJ2, in accordance with the "¥mem¥Picture.ppt/page 1" following the "Display" command in line number L2 of scenario file SF2, extracts and reads out the first page of the "Picture.ppt" file stored in scenario storage area 107 of projector PJ2. Further, in accordance with the "¥¥SB ¥FLDA¥Document.doc/page2" following the "Display" command in line number L10, it extracts and reads out the second page of the "Document.doc" file stored in folder "FLDA" of file server SB. Further, in accordance with the "¥¥SB¥FLDB¥Graph.xls/sheet3" following the "Display" command in line number L12, it extracts and reads out the third sheet (third page) of the "Graph.xls" file stored in folder "FLDB" of file server SB.

The "Pause" commands included in scenario file SF1 line numbers L3, L5 and L7 are commands to maintain the preceding process until there is input from the user. For example, when an image is projected and displayed at line number L2, the image indicated in line number L2 is displayed until the user instructs transition to the next process by using the remote controller RM. By means of this, the user can perform pagewise changing of displayed images at a desired timing.

The "Wait" commands included in line numbers L9, L11, L13 and L15 of scenario file SF1 are commands to maintain the preceding process for an indicated time interval. For example, when an image is displayed at line number L8, after the image has been displayed for the "10000 msec" following the "Wait" command, it moves to the process of the next line number L1. By means of this, projected images can be automatically page-forwarded.

Display time for each page image may be set in the scenario creation window SMW of FIG. 12. Specifically, each information display image IP displaying each selected source file information in selected source file information area SFA is selected, a dialog box (not shown) is displayed, and image display time is set in the dialog box.

In this way, in step S206, projector PJ2, in accordance with a scenario file SF1 like that shown in FIG. 14, reads out multiple format source files from a storage area in projector PJ2 or a file server connected to the network NW, and sequentially projects pagewise image.

As described above, computer PC2 in this embodiment has a scenario creating section 332B and functions as a scenario creating device. Scenario creating section 332B displays on display section 350 a scenario creation window SMW that includes a file management area MNA for displaying source files; a selected source file information area SFA for displaying information of a source file selected by the user in file management area MNA, in an order indicated by the user; and a reduced image display area SPA that displays, for a source file of predetermined format (PPT file) that includes pagewise scenario information and image information displayed in file management area MNA, the pagewise image information as a reduced pagewise image. Scenario creating section 332B then creates a scenario file SF1 like that shown in FIG. 14, in accordance with the display content in selected source file information area SFA.

By using such a scenario creating device PC2, scenario files can be created easily simply by displaying selected source file information in a desired order in the selected source file information area SFA. By supplying a scenario file created in this way to a scenario reproducing device such projector PJ2, pagewise images can easily be displayed in sequence.

Also, the projector PJ2 of this embodiment comprises a page image processor for reading out a source file in accordance with a scenario file stored in scenario storage area 107, and preparing page image data representing pagewise images for projection display. This page image processor can prepare the page image data on the basis of a plurality of source files. By using such a projector PJ2 as the scenario reproducing device, the projector is capable of easily displaying pagewise images in sequence.

In this specification, the term "projector" refers in a narrow sense to projector PJ2 alone, but in some instances also refers in a broad sense to projector PJ2 and computer PC2. That is, in the second embodiment, a scenario reproducing system comprising projector PJ2 as the scenario reproducing device and computer PC2 as the scenario supplying device corresponds to the projector in the fifth aspect of this invention.

C. Third Embodiment

Figure 15:
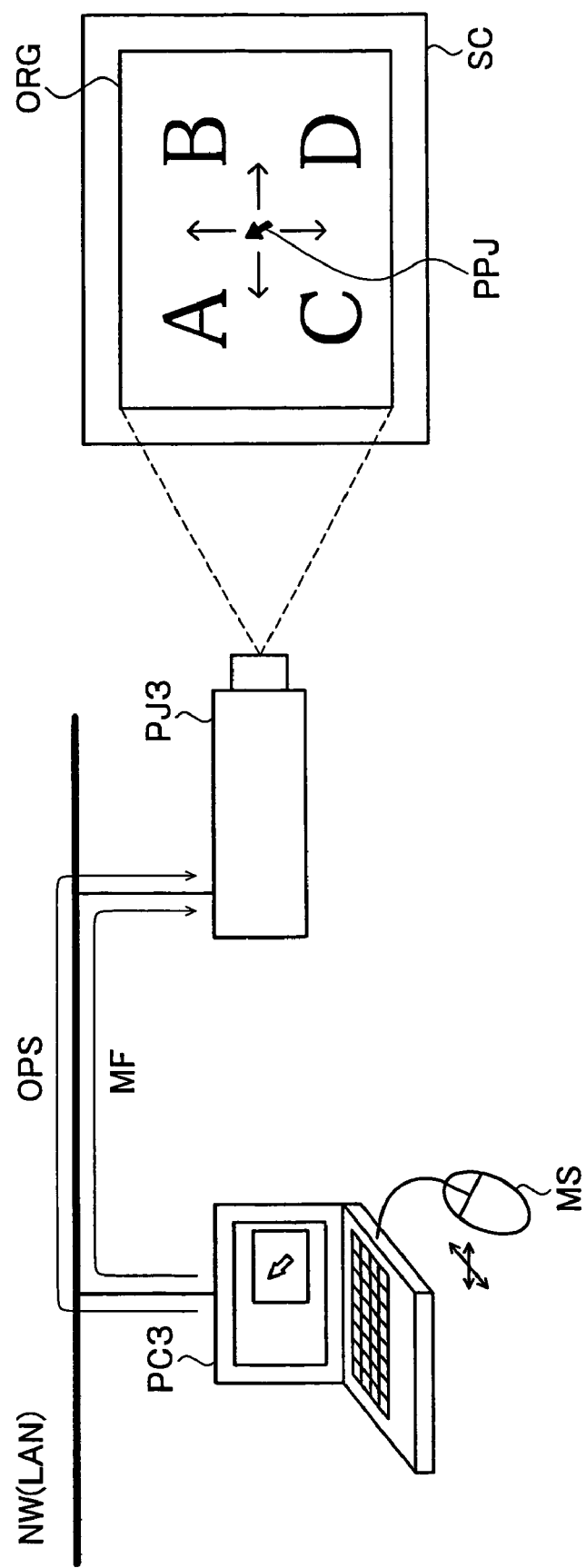
FIG. 15 is an illustrative diagram showing a scenario reproducing system in a third embodiment.

FIG. 15 is an illustrative diagram showing a scenario reproducing system in a third embodiment. This scenario reproducing system comprises a computer PC3 having the function of a source file supplying device; and a projection type display device, i.e. a projector PJ3, having the function of a scenario reproducing device. Computer PC3 and projector PJ3 are interconnected via a network NW.

The projector PJ3 of this embodiment can reproduce pagewise images using as-is source files of predetermined format that include pagewise scenario information and image information. Thus, the computer PC3 of this embodiment supplies a source file MF of predetermined format as-is to projector PJ3. In accordance with scenario information contained in the supplied source file MF, the projector PJ3 reads out image information contained in the source file MF, and displays page images ORG corresponding to source files MF on a screen SC.

As shown in FIG. 15, computer PC3 comprises a mouse MS as a pointing device. As will be described later, computer PC3 generates operation information OPS accompanying operation of the mouse MS and supplies it to projector PJ3 via network NW. Projector PJ3, on the basis of operation information OPS, can display, for example, a pointer image PPJ in a page image ORG displayed on screen SC. In FIG. 15, computer PC3 supplies operation information OPS to projector PJ3, but does not supply image data representing pointer image PPJ.

Figure 16:
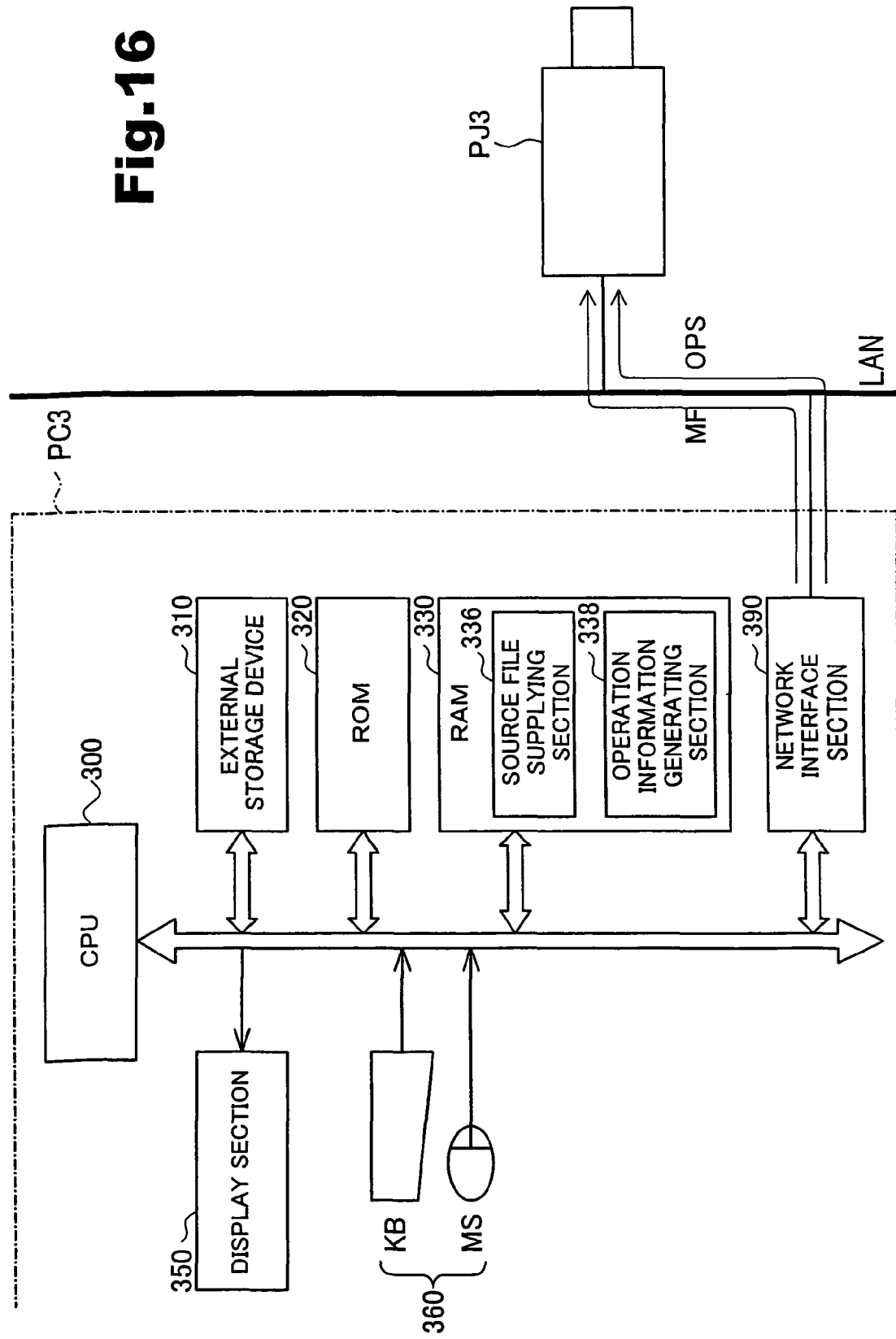
FIG. 16 is an illustrative diagram showing a simplified arrangement of computer PC3 of FIG. 15.

FIG. 16 is an illustrative diagram showing a simplified arrangement of computer PC3 of FIG. 15. This computer PC3 has an arrangement substantially similar to computer PC2 of FIG. 9, but RAM 330 stores a source file supplying program for implementing the function of a source file supplying section 336, and an operation information generating program implementing the function of an operation information generating section 338.

Source file supplying section 336 has the function of supplying a prepared file of predetermined format (for example, a PPT file) as-is to projector PJ3 via a network interface section 390.

Operation information generating section 338 has the function of detecting operation of input section 360 by the user, and generating operation information OPS on the basis of the detection result. The generated operation information OPS is supplied to projector PJ3 via network interface section 390.

Figure 17:
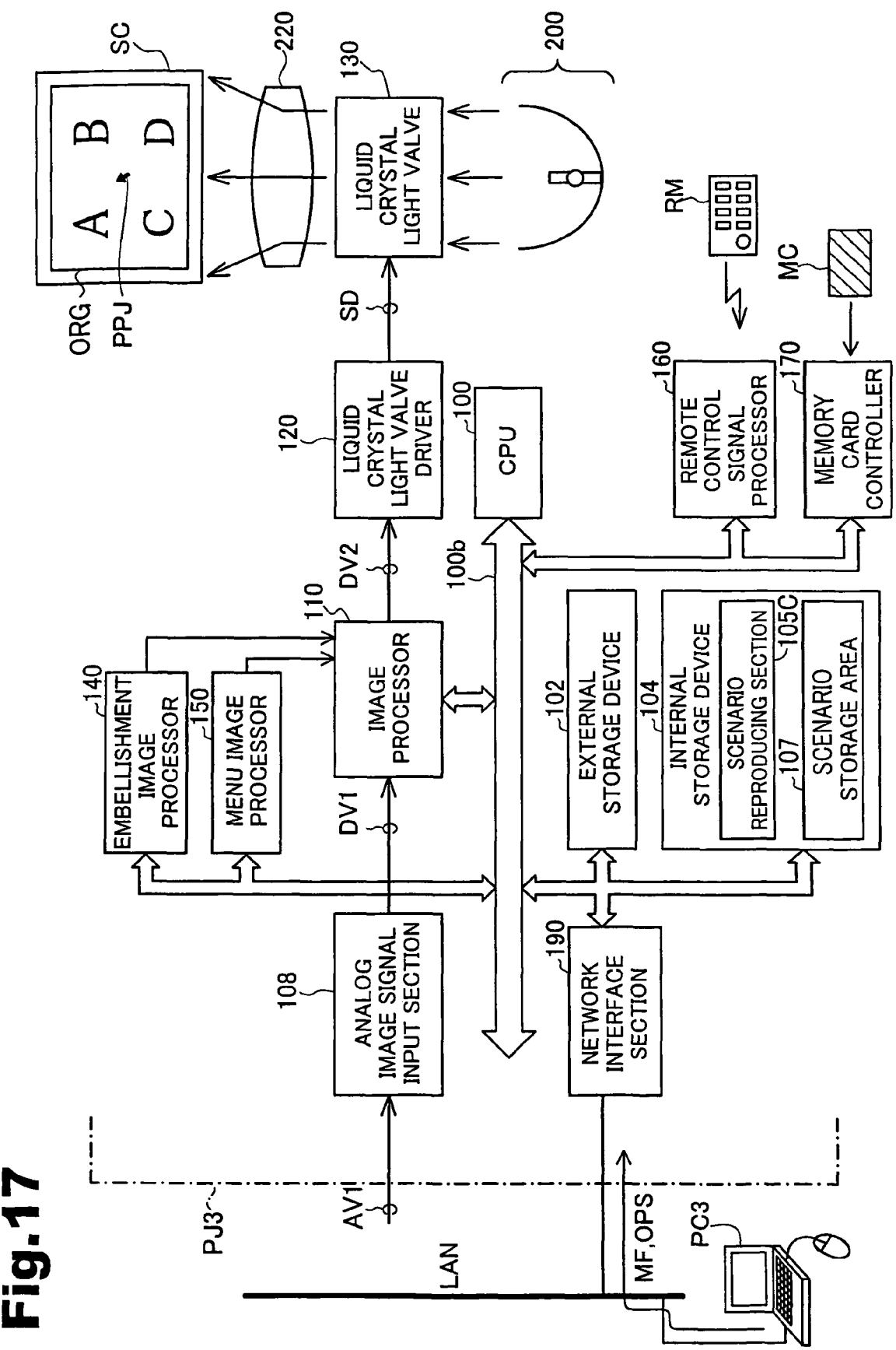
FIG. 17 is an illustrative diagram showing a simplified arrangement of projector PJ3 of FIG. 15.

FIG. 17 is an illustrative diagram showing a simplified arrangement of projector PJ3 of FIG. 15. As this projector PJ3 has an arrangement substantially similar to projector PJ2 of FIG. 10, detailed description is omitted.

However, network interface section 190 has the function of supplying a source file MF—supplied from computer PC3 via a LAN—to the scenario storage area 107 of internal storage device 104. Network interface section 190 also has the function of supplying operation information OPS—supplied from computer PC3 via a LAN—to CPU 100 via bus 100b. CPU 100, on the basis of the operation information OPS, operates image processor 110, embellishment image processor 140, menu image processor 150, etc. For example, in the case that operation information OPS contains position information representing the position of a pointer image PPJ superimposed in an original image (page image) ORG, embellishment image processor 140 supplies pointer image data to image processor 110 on the basis of operation information (position information) OPS. By means of this, image processor 110 can synthesize the original image data (page image data) and pointer image data on the basis of the operation information (position information) OPS, and as a result a pointer image PPJ is superimposed at a predetermined location of the original image (page image) ORG.

Internal storage device 104 comprises a scenario reproducing section 105C for reproducing a supplied source file (PPT file) MF, and a scenario storage area 107 for storing source files MF supplied from network interface section 190. Scenario reproducing section 105C is provided with a viewer function allowing the contents of source files MF of predetermined format to be viewed. That is, in accordance with scenario information included in the supplied source file MF, scenario reproducing section 105C reads out image information contained in the source file MF, and supplies pagewise page image data as original image data to image processor 110.

It should be noted that CPU 100, image processor 110, embellishment image processor 140 and scenario reproducing section 105C in this embodiment correspond to the page image processor in this invention.

Figure 18:
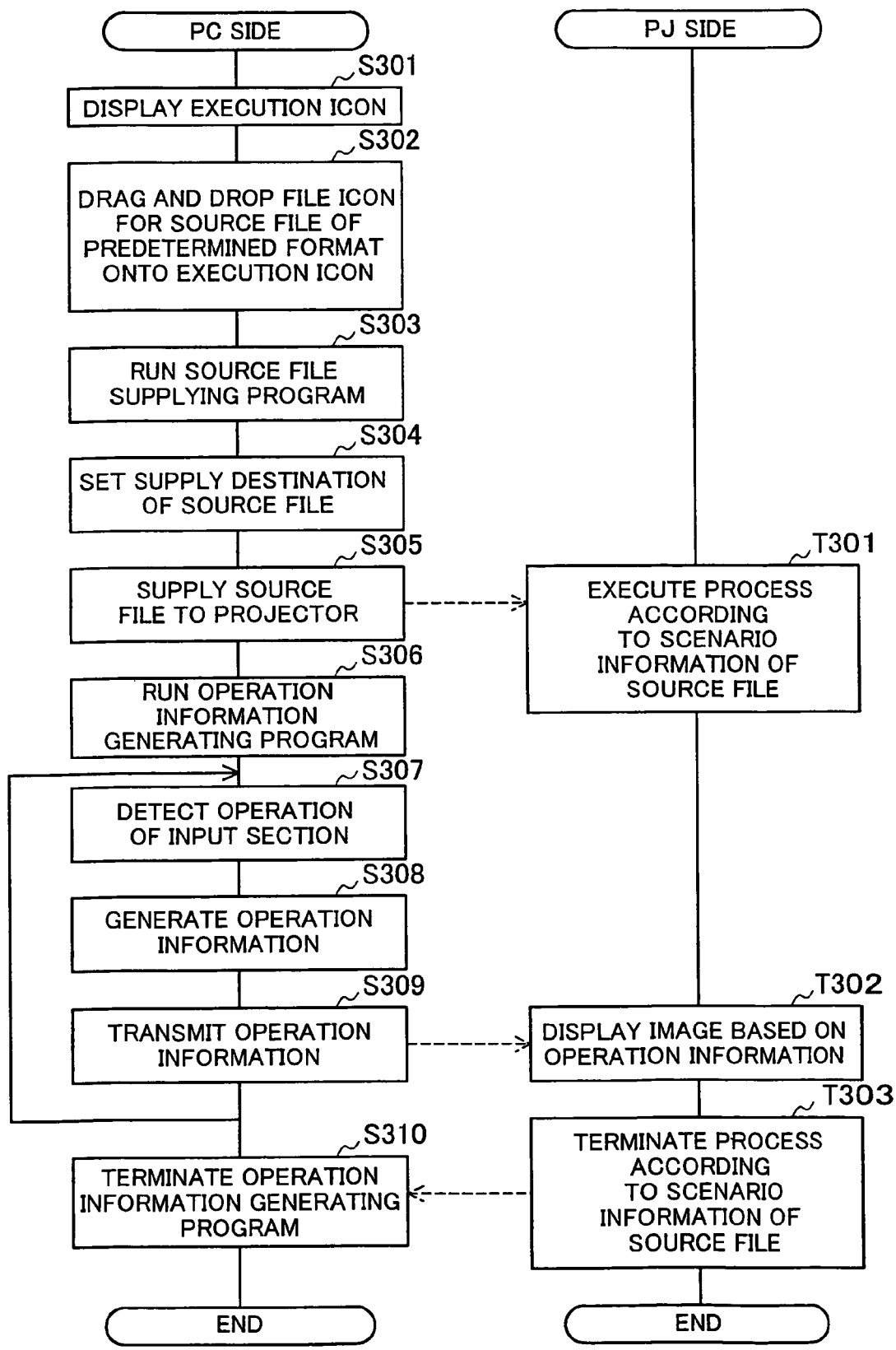
FIG. 18 is a flow chart showing a series of processes in the scenario reproducing system of FIG. 15.

FIG. 18 is a flow chart showing a series of processes in the scenario reproducing system of FIG. 15.

Figure 19:
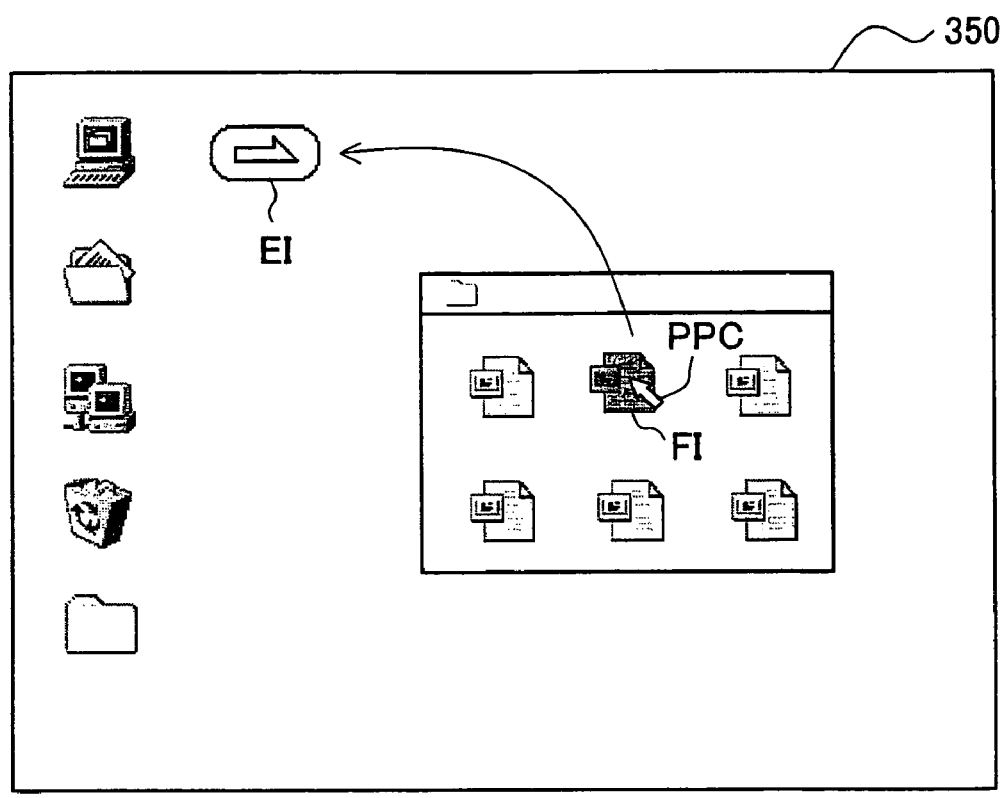
FIG. 19 is an illustrative diagram showing a desktop screen displayed on display section 350.

In Step S301, an execution icon for causing processing to be executed by source file supplying section 336 is displayed on display section 350 of computer PC3 (FIG. 16). FIG. 19 is an illustrative diagram showing a desktop screen displayed on display section 350. As illustrated, the desktop screen includes an execution icon EI for causing processing to be executed by source file supplying section 336.

In Step S302, the user operates the mouse MS (FIG. 9) of input section 360 to drag and drop a file icon FI for a source file of predetermined format on the execution icon EI, as shown in FIG. 19. Here, source file of predetermined format means a source file that includes pagewise scenario information and image information, and in the present embodiment is assumed to be a PPT format file created using PowerPoint (trademark of Microsoft Corp.) or the like. As noted earlier, drag and drop process means a process of placing the mouse pointer PPC over the file icon FI for the source file and dragging it, and then placing the icon over execution icon EI and dropping it.

In Step S303, the source file supplying program is run by means of the drag and drop process of Step S302. At this time the program stored in external storage device 310 (FIG. 16) of computer PC2 is loaded into RAM 330 and functions as source file supplying section 336.

In Step S304, source file supplying section 336 displays on display section 350 a dialog box (not shown) for setting the supply destination to which the source file should be supplied. In this embodiment, the user sets as the supply destination for the source file the projector PJ3 (FIG. 16) which is connected via network interface section 390. At this time a resolution (for example, XGA etc.) appropriate for the projector PJ3 set as the supply destination is set as well, and the set resolution is used in processing by the operation information generating section 338.

In Step S305, source file supplying section 336 supplies a source file as-is to projector PJ3. Specifically, source file supplying section 336 supplies the source file via network interface section 390 to the scenario storage area 107 in the internal storage device 104 of projector PJ3. As in the second embodiment, the source file may be stored in an external storage device 102 or a memory card MC installed in memory card controller 170.

In Step T301, projector PJ3 automatically initiates a process according to the scenario information in the source file, at the same time that the source file is supplied. Specifically, scenario reproducing section 105C in the internal storage device 104 of projector PJ3 reads out image information on the basis of pagewise scenario information contained in the source file of predetermined format (PPT File) stored in scenario storage area 107, and supplies pagewise page image data as original image data to image processor 110. In this way, in projector PJ3, sequential images are projected and displayed in according to scenario information.

Source file supplying section 336 supplies the source file to projector PJ3, and in Step S306 an operation information generating program runs. At this time, operation information generating section 338 displays on display section 350 an operation detection window that includes an operation information generating area.

Figure 20:
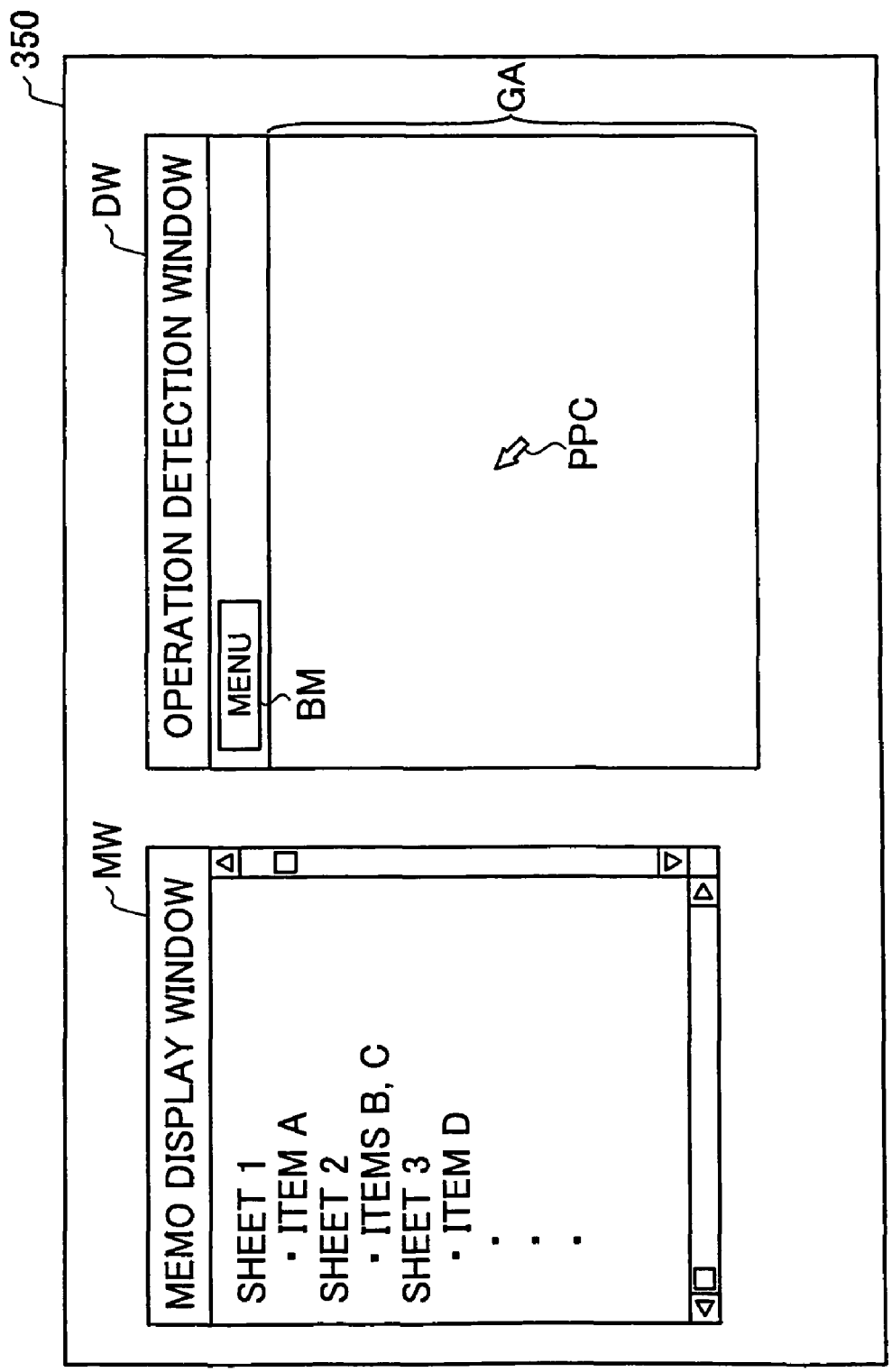
FIG. 20 is an illustrative diagram showing an operation detection window DW displayed on display section 350 of computer PC3.

FIG. 20 is an illustrative diagram showing an operation detection window DW displayed on display section 350 of computer PC3. On the display section 350 shown in FIG. 20, the operation detection window DW and a memo display window MW for displaying a memo indicating content to be presented in a presentation, etc are displayed.

As shown in the drawing, operation detection window DW includes a "Menu" button BM and an operation information generating area GA. Here, operation information generating area GA means an area for generating operation information OPS accompanying operation of the mouse MS. In FIG. 20, the pointer image PPC corresponding to mouse MS is displayed over the entire area of display section 350, but only when pointer image PPC is displayed within operation information generating area GA, operation information OPS accompanying operation of the mouse MS is generated. By so doing, when the user operates the mouse MS with the pointer image PPC displayed in an area outside the operation information generating area GA, operation information OPS for the mouse MS is not generated, thus allowing the mouse MS to be used to perform other operations, for example, an operation to modify a memo to be displayed in memo display window MW.

In Step S307, operation information generating section 338 detects operation of the mouse MS as input section 360. Operation of mouse MS means an operation in which the user moves the mouse MS, a depression operation of a switch provided to the mouse MS, etc. Then, in Step S308 operation information generating section 338 generates operation information OPS on the basis of the detection result in Step S307.

As described above, the operation information generating section 338 of this embodiment detects operation of the mouse MS only when pointer image PPC corresponding to the mouse MS is displayed within operation information generating area GA. Also, in this embodiment, in Step S304, projector PJ3 is set as the source file supply destination, and resolution appropriate for projector PJ3 is set, so operation information generating area GA may be associated with an image area of the original image (page image) ORG projected onto screen SC. That is, the positional relationship of the pointer image PPC in operation information generating area GA may be substantially matched to the positional relationship of the pointer image PPJ in the original image (page image) ORG. Specifically, operation information generating section 338 calculates the position of the pointer image PPC in operation information generating area GA as coordinate values with reference to the set resolution (Step S304) of projector PJ3. Assuming that resolution of projector PJ3 is set to XGA (1024×768), where pointer image PPC is displayed at the upper left edge of operation information generating area GA, the coordinate value is designated as (1, 1), where displayed in the center the coordinate value is designated as (512, 384), and where displayed at the lower right edge the coordinate value is designated as (1024, 768). This coordinate value information is position information for the mouse MS and is output as operation information OPS.

In Step S309, the computer PC3 transmits operation information OPS.

Projector PJ3, in Step T302, displays an image on the basis of the operation information OPS. Specifically, on the basis of the operation information OPS, pointer image PPJ is displayed at a predetermined position in the original image (page image) ORG (i.e., a position corresponding to the position of pointer image PPC in operation information generating area GA).

By repeating the processes of Steps S307-S309 and T302, the pointer image PPJ may be moved in the original image (page image) ORG projected onto screen SC, in association with movement of the mouse MS.

In Step T303, the scenario reproducing section 105C in projector PJ3 terminates the process in accordance with pagewise scenario information contained in the supplied source file of predetermined format (PPT file).

In Step S310, computer PC3, in accordance with termination information supplied from projector PJ3, terminates the operation information generating program.

By the way, when the user performs an operation of pressing (clicking) a switch provided to the mouse MS in Step S307, during projection of an image by projector PJ3 in accordance with scenario information in Step T301, images can be page-forwarded sequentially.

Also in Step S307, when the user performs an operation of moving mouse MS while pressing a switch provided to the mouse MS, an area can be indicated in the projected page image ORG. With the projector PJ3 in this embodiment, by indicating an area, an embellishment image different from a pointer image, such as a box image or border frame image, can be superimposed on the indicated area in page image ORG.

As will be apparent from the preceding description, in Step S307, not only position information for the mouse MS but also switch information for the mouse MS is generated as operating information OPS.

FIGS. 21(A-1)-21(A-3) and 21(B-1)-21(B-3) are illustrative diagrams of the process when superimposing a box image PB in a page image ORG using a pointer image PPJ in page image ORG. The size of box image PB is determined by indicating two opposing apices (a start point and an end point) of box image PB in page image ORG. FIGS. 21(A-1)-21(A-3) show an operation information generating area GA included in operation detection window DW (FIG. 20). FIGS. 21(B-1)-21(B-3) show a page image ORG displayed on screen SC by projector PJ3.

In FIG. 21(A-1), the mouse MS of computer PC3 is operated to indicate a start point P1C for indicating an area. This is done by the user moving the mouse MS to move the pointer image PPC to the start point P1C and pressing a switch on the mouse MS. At this time, as shown in FIG. 21(B-1), a start point P1J is indicated in page image ORG by pointer image PPJ. When start point P1J is indicated in page image ORG, a start point image PS signifying the start point of box image PB is superimposed at the start point P1J position.

In FIG. 21(A-2), the user moves the mouse MS to the end point P2C of the area while continuing to press the switch of the mouse MS. At this time, within operation information generating area GA, a frame having a segment joining start point P1C and end point P2C as a diagonal line is displayed with a broken line. Meanwhile, as shown in FIG. 21 (B-2), when start point image PS is displayed in page image ORG, an end point image PE is displayed instead of pointer image PPJ, and the end point P2J in page image ORG is indicated using end point image PE.

In FIG. 21(A-3), the user halts pressing of the switch of the mouse MS. At this time, as shown in FIG. 21(B-3), a box image PB is superimposed over a range set by means of start point P1J and end point P2J in page image ORG.

Embellishment image data representing the respective embellishment images of start point image PS, end point image PE, and box image PB is prepared by embellishment image processor 140 (FIG. 17) and supplied to image processor 110.

Also, the type of embellishment image such as box image PB superimposed on page image ORG is predetermined by selecting the "Menu" button BM contained in operation detection window DW (FIG. 20). Specifically, when the user moves the pointer image PPC on the operation detection window DW of computer PC3 and selects the "Menu" button BM, menu display start information is supplied to projector PJ3 via the LAN. The CPU 100 in projector PJ3, on the basis of the menu display start information supplied to network interface section 190, controls the menu image processor 150 and image processor 110, and causes a menu image to be projected onto screen SC as an original image ORG. The user, using the pointer image PPJ displayed superimposed in the original image ORG (menu image), selects the type of embellishment image to be used. It is also possible to display the menu image using the remote controller RM and select the type of embellishment image to be used using the remote controller RM.

As described above, the computer PC3 of this embodiment comprises a source file supplying section 336 and functions as a source file supplying device. The source file supplying section 336 causes there to be displayed on display section 350 an execution icon for causing the source file supplying section 336 to execute a process, and by operating the mouse MS to drag and drop the file icon for source file onto the execution icon, the source file MF is supplied to scenario storage area 107. Also, projector PJ3 comprises a page image processor for reading a source file supplied from source file supplying device PC3 and stored in scenario storage area 107, and, in accordance with scenario information, preparing page image data representing a pagewise image represented by image information.

It should be noted that, in the third embodiment, the scenario reproducing system comprising projector PJ3 as the scenario reproducing device and computer PC3 as the source file supplying device corresponds to the projector in the sixth aspect of the invention.

By using the projector in the sixth aspect of the invention, the labor of creating a scenario file can be omitted. As a result, the projector can easily sequentially display pagewise images.

C-1. Modifications of the Second and Third Embodiments

In the second embodiment, computer PC2 comprises only a scenario creating section 332B in RAM 330, but computer PC2 may also comprise a scenario creating section having a function like that of the source file supplying section 336 provided to the computer PC3 in the third embodiment. By so doing, the user may supply a scenario file prepared in advance by scenario creating section 332B of computer PC2 to a projector (i.e. projection type display device) PJ2 by dragging and dropping the file icon for the scenario file on the execution icon of the scenario supplying section, as shown in FIG. 19.

Also, in the second embodiment computer PC2 comprises only a scenario creating section 332B in RAM 330, but computer PC2 may also comprise an operation information generating section 338 like the computer PC3 of the third embodiment, so that operation of the mouse MS by the user can be detected and, based on the detection result, operation information OPS can be generated. By so doing, a projector (i.e. projection type display device) PJ2 can be operated by means of the user operating the mouse MS.

In the above case, the scenario reproducing system comprising: a projector PJ2 as a scenario reproducing device; and a computer PC2 as a scenario supplying device having scenario supplying section or operation information generating section corresponds to the projector in the fifth aspect of the invention.

In the second and third embodiments, computers PC2, PC3 comprise a mouse MS as the input section 360, but instead of a mouse MS there could be provided a tablet, trackball, track pad, joystick or other pointing device. These pointing devices have the same function as the mouse MS and correspond to the pointing device in the present invention.

D. Fourth Embodiment

In a fourth embodiment, there is described a projector having a security function pertaining to the invention, and an image display system composed of this projector connected to a network.

D-1 Projector Arrangement

Figure 22:
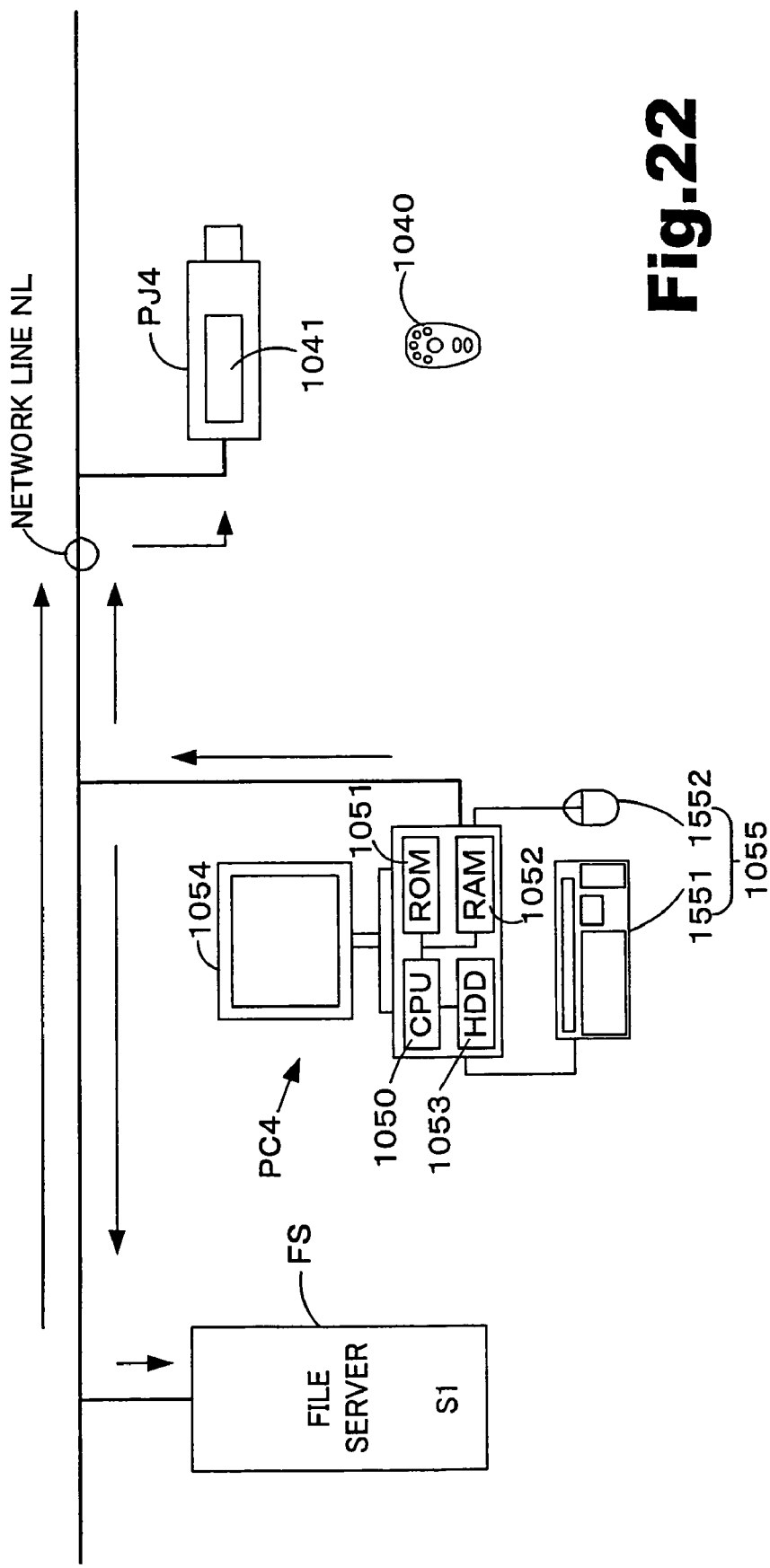
FIG. 22 is an illustrative diagram showing an exemplary arrangement for an image display system composed of a projector in accordance with a fourth embodiment, connected to a network.
Figure 23:
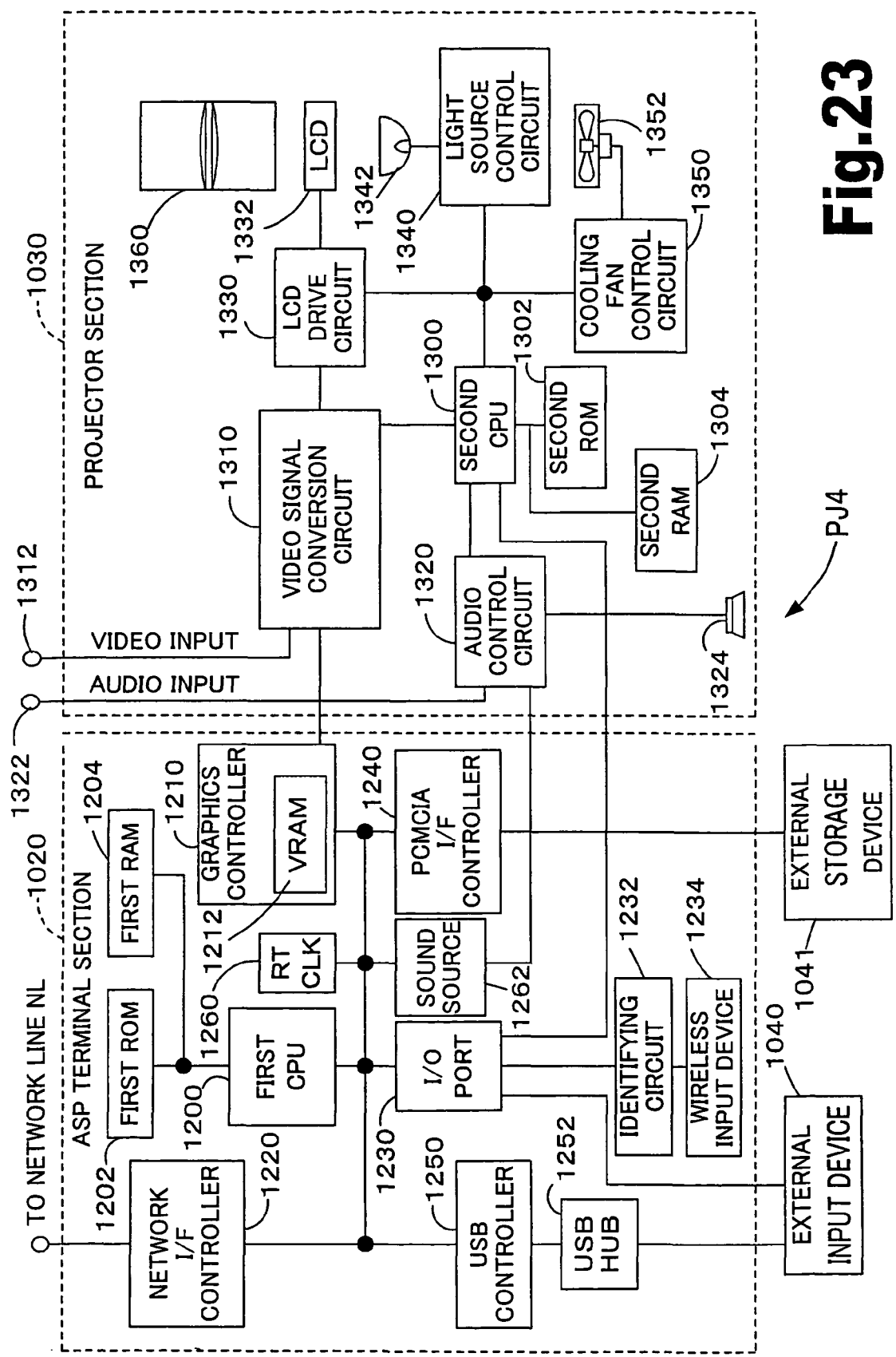
FIG. 23 is a block diagram showing an internal circuit arrangement of a projector in accordance with a fourth embodiment.

A simplified arrangement of the projection type display device (projector) in accordance with this embodiment is described with reference to FIG. 22 and FIG. 23. FIG. 22 is an illustrative diagram showing an exemplary arrangement for an image display system composed of a projector in accordance with a fourth embodiment, connected to a network. FIG. 23 is a block diagram showing an internal circuit arrangement of a projector in accordance with a fourth embodiment.

Projector PJ4 is connected to a file server FS and a personal computer PC4 via a network line NL. Personal computer PC4 comprises a CPU 1050 for executing application programs, a ROM 1051 for storing application programs, and a RAM 1052 for temporarily storing processing content during execution of an application program. Personal computer PC4 also comprises an internal hard disk drive (HDD) 1053 for storing the data file (display data) created by the application program at the time of termination of the application program, and a display 1054 for displaying a user interface for the application program. A data file stored in HDD 1053 of personal computer PC4 is transferred to a file server FS by a procedure described later. The CPU 1050 of personal computer PC4, during transfer of the data file to the file server FS, generates an index file and transfers it to the projector PJ4. Commands and data are given to personal computer PC4 via, for example, output devices 1055, namely a keyboard 1551 and mouse 1552.

Projector PJ4 comprises an external storage device 1041 such as a memory card based on the PCMCIA standard, and stores the index file transferred from the personal computer PC4. Commands and data are given to projector PJ4 via, for example, an external input device 1040 such as a remote controller. File server FS is a server that stores data files in place of projector PJ4, and has a plurality of directories. In this embodiment, file server FS is assigned the appellation S1. In the event of reproducing (projecting) a data file, when the projector PJ4, using an index file, requests the file server FS to transfer the data file, the requested data file is transferred from file server FS to projector PJ4 via the network line NL.

The internal arrangement of projector PJ4 in this embodiment is described making reference to FIG. 23. Projector PJ4 comprises an ASP terminal section 1020 that functions mainly as an ASP terminal, and a projector section 1030 that functions mainly as a conventional projector. That is, the projector PJ4 in this embodiment can function as an ASP terminal for an ASP.

ASP terminal section 1020 comprises: a first central processing unit (CPU) 1200 for executing various operation processes including execution a client application program for the ASP; a first read-only memory (ROM) 1202 for storing various programs for execution by the first CPU 1200, including viewer application programs, client application programs, and application programs for acquiring data files on the basis of index files; and a first random-access memory (RAM) 1204 for temporarily storing operation results of first CPU 1200, data etc. Further, first ROM 1202 stores a authorization program executed during reproduction (projection) of display data. First CPU 1200 and first ROM 1202 are connected so as to be capable of unidirectional or bi-directional communication; first CPU 1200 and first RAM 1204 are connected so as to be capable of bi-directional communication.

ASP terminal section 1020 comprises a graphics controller 1210 which is connected so as to be capable of bidirectional communication with first CPU 1200 and generates image data on the basis of draw commands from first CPU 1200. Graphics controller 1210 has an LSI chip (not shown) for generating images, and a video memory (VRAM) 1212 for storing generated images (display images).

ASP terminal section 1020 comprises, as interfaces for sending and receiving commands and data between projector PJ4 and external devices, a network interface controller 1220, an I/O port 1230, a PCMCIA interface controller 1240, and a USB controller 1250. Network interface controller 1220 is, for example, a controller based on the Ethernet standards, and converts commands and data transmitted from ASP terminal section 1020 to network line NL into the proper format in accordance with the protocol of network communication, or converts signals received from network line NL into a format suitable for processing by ASP terminal section 1020. I/O port 1230 is a typical input/output port and is connected to a wireless input device 1234 via an identifying circuit 1232, as well as to an external input device 1040 and a second CPU 1300 of projector section 1030. Wireless input device 1234 is an input device for receiving input data transmitted wirelessly from a wireless type input device, and identifying circuit 1232 identifies whether or not the input data received from wireless input device 1234 is input data transmitted to itself.

PCMCIA interface controller 1240 is a controller for transferring data from ASP terminal section 1020 to an external device in accordance with the PCMCIA standard, and transferring data from an external device to ASP terminal section 1020. In this embodiment, for example, a PC card memory is connected as external storage device 1041, and display data transferred from personal computer PC4 is stored in external storage device 1041. USB controller 1250 is a controller for transferring data between ASP terminal section 1020 and external devices in accordance with the USB standard, and is connected, for example, to external input device 1040 via USB HUB 1252.

ASP terminal section 1020 is also connected to a real time clock 1260 for supplying real time in ASP terminal section 1020, and a sound source 1262 for generating sound data on the basis of instructions from first CPU 1200.

First CPU 1200 and the controllers 1210 etc. in ASP terminal section 1020 are interconnected via a bus for transfer of data and commands.

Next, the arrangement of projector section 1030 is described. Projector section 1030 comprises: a second central processing unit (CPU) 1300 for executing predetermined programs and controlling the circuits of projector section 1030; a second read-ROM) only memory (ROM) 1302 for storing programs for execution by the second CPU 1300; and a second random-access memory (RAM) 1304 for temporarily storing operation results of second CPU 1300, data etc. Second CPU 1300 and second ROM 1302 are connected so as to be capable of unidirectional or bi-directional communication; second CPU 1300 and second RAM 1304 are connected so as to be capable of bi-directional communication.

Projector section 1030 further comprises a video signal conversion circuit 1310, an audio control circuit 1320, a liquid crystal (LCD) drive circuit 1330, a light source control circuit 1340, a cooling fan control circuit 1350, and a projection optical system 1360.

Video signal conversion circuit 1310 implements the functions of an analog-digital conversion function, a decoding function, a sync signal separation function, and an image processing function. That is, video signal conversion circuit 1310 converts an analog video signal given from an external video signal input terminal 1312 into digital image data, and in sync with a sync signal, writes the converted digital image data into a frame memory (not shown) in video signal conversion circuit 1310, or reads from frame memory digital image data that has been written to frame memory. As analog video signals there may be input an RGB signal output from a personal computer, or a composite video signal output from a videotape recorder etc. In the event that the analog video signal is a composite video signal, video signal conversion circuit 1310 demodulates the composite video signal as well as separating the sync signal and the component video signal composed of color signals of three colors RGB, and converts the component video signals into digital image data. In the event that the analog video signal is an RGB signal output from a personal computer, it is input as the component video signal and the sync signal is also input separately, so a separation process is not needed, and video signal conversion circuit 1310 converts the component video signals to digital image data.

Video signal conversion circuit 1310 is also given a digital video signal transmitted from the graphics controller 1210 of ASP terminal section 1020. In this case, it is input as the digital video signal and the sync signal is also supplied separately so an analog-digital conversion process and separation process are not needed.

Audio control circuit 1320 is connected to an external audio signal input terminal 1322, a speaker 1324, the second CPU 1300, and the sound source 1262 of ASP terminal section 1020. Audio control circuit 1320 is connected to the second CPU 1300, and according to an instruction from second CPU 1300 drives speaker 1324 by means of a drive signal generated on the basis of an audio signal or sound data sent from external audio signal input terminal 1322 or sound source 1262.

LCD drive circuit 1330 receives image data processed by video signal conversion circuit 1310, and in response to the received image data drives LCD 1332 to modulate illuminating light radiated by light source 1342. The illuminating light modulated by LCD 1332 is projected via projection optical system 1360 including a lens onto a projection surface, for example, a projection screen. Light source control circuit 1340 is connected to light source 1342, and controls on/off etc. of light source 1342 according to instructions from second CPU 1300. To the back of light source 1342 is arranged a cooling fan 1352 for directing cooling air onto light source 1342. To cooling fan 1352 is connected cooling fan control circuit 1350, and cooling fan control circuit 1350 controls the rotation speed etc. of cooling fan 1352 according to instructions from second CPU 1300.

D-2. Basic Operation of Projector

Next the basis operation of projector PJ4 in accordance with this embodiment having the arrangement mentioned above is described with reference to FIG. 22 and FIG. 23.

A signal given to projector PJ4 via network line NL is converted by the network interface controller 1220 of ASP terminal section 1020 into a format appropriate for ASP terminal section 1020, and transferred as data and a command to first CPU 1200. First CPU 1200 temporarily stores the transferred data in first RAM 1204, and determines whether the transferred command is a command directed to ASP terminal section 1020 or a command directed to projector section 1030. If the transferred command is a command directed to projector section 1030, first CPU 1200 transfers the command to the second CPU 1300 of projector section 1030 via the I/O port 1230.

On the other hand, if the transferred command is a command directed to ASP terminal section 1020, first CPU 1200 executes operation processing on the basis of the transferred command. First CPU 1200, for example, takes data stored in first RAM 1204 and stores it in external storage device 1041. Also, first CPU 1200, in the event that a reproduction request (projection display request) for data stored in external storage device 1041 is given by remote controller 1040 etc., executes a data file reproduction program using an index file, described later. First CPU 1200, in order to read out (reproduce) data stored in external storage device 1041 or first RAM 1204, reads out from first ROM 1202, runs an appropriate viewer application program, generates user interface data for the stored data, and sends it to graphics controller 1210 together with a Draw command.

Or, in the event that projector PJ4 functions as a server based computing (SBA) client, first CPU 1200 runs the corresponding client application program and sends a Draw command to graphics controller 1210 so that user interface screen data is generated from the received display image data of dedicated format. Graphics controller 1210, in accordance with the received Draw command, generates user interface image data (hereinafter called "image data") to be displayed on the basis of the display screen data and stores it in VRAM 1212 in graphics controller 1210.

Graphics controller 1210, in accordance with an instruction from first CPU 1200, at predetermined timing reads out image data stored in VRAM 1212 in graphics controller 1210, and transfers it to the video signal conversion circuit 1310 of projector section 1030. First CPU 1200 receives a command or data from external input device 1040 via USB HUB 1252, USB controller 1250 and I/O port 1230. First CPU 1200, in accordance with the command received via external input device 1040 or network line NL, takes data stored in RMA 1204 or image data stored in VRAM 1212 in graphics controller 1210 via PCMCIA interface controller 1204, and stores it in external storage device 1041.

Video signal conversion circuit 1310, upon receiving image data from graphics controller 1210, executes the previously-described process and sends the processed image data to LCD drive circuit 1330. LCD drive circuit 1330 drive-controls LCD 1332 in response to the received image data, and projects the desired image data on the projection screen.

Second CPU 1300, in the event, for example, that a command sent from network line NL via 1/O port 1230 is an instruction to turn on light source 1342, turns on light source 1342 via light source control circuit 1340. Second CPU 1300 controls operation status of cooling fan 1352 (rotation speed, rotation timing etc.) according to the temperature of light source 1342 via cooling fan control circuit 1350.

Data transmission from projector PJ4 to network line NL is executed via network interface controller 1220 under instructions of first CPU 1200.

Figure 24:
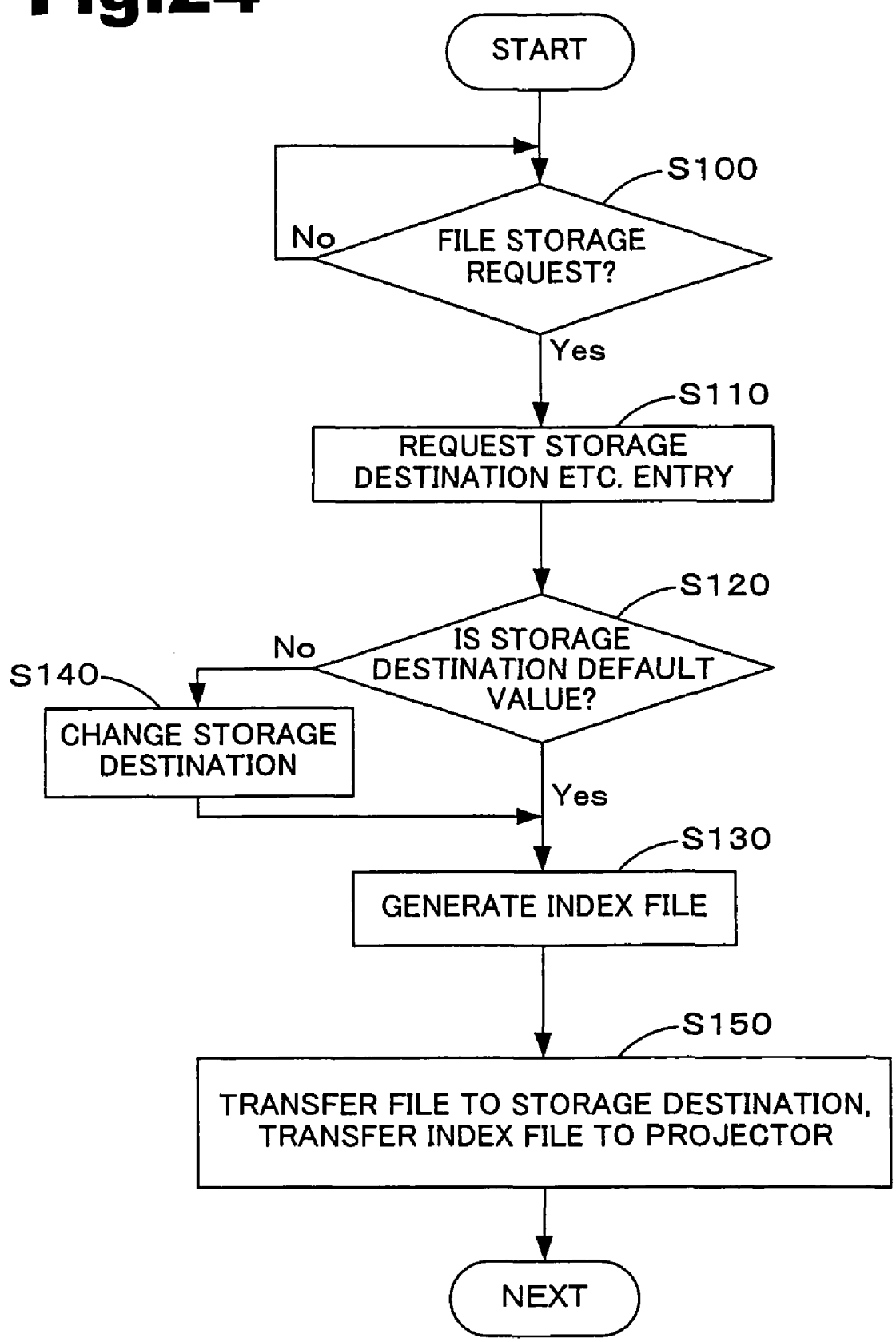
FIG. 24 is a flow chart showing a processing routine executed when transferring display data from a personal computer PC4 to a projector PJ4.
Figure 25:
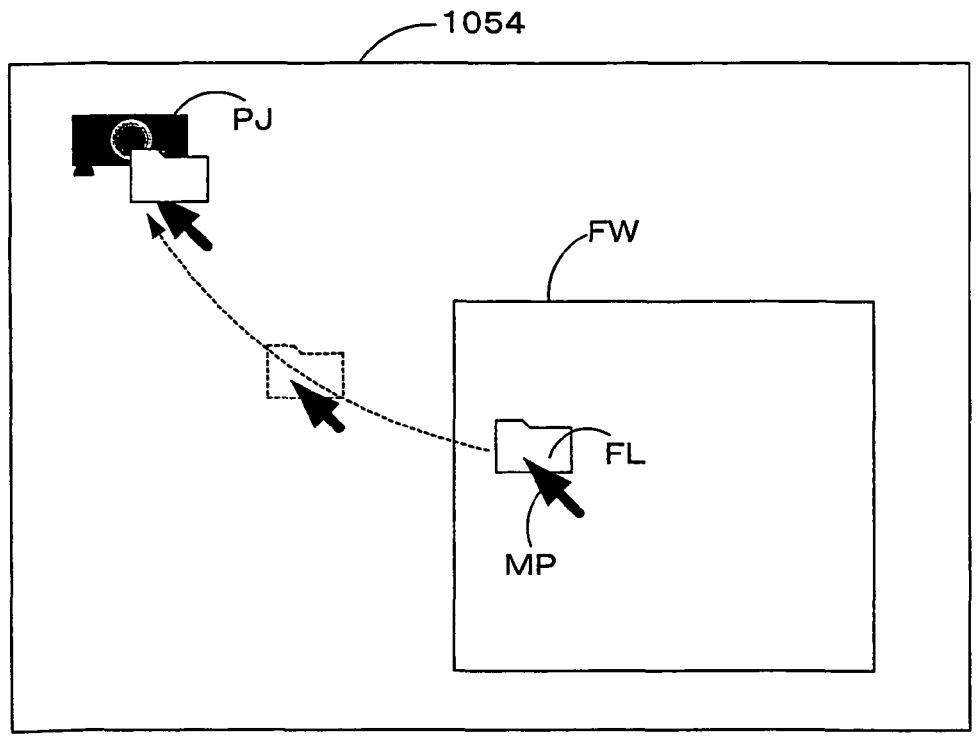
FIG. 25 is an illustrative diagram showing a process executed on display 1054 of personal computer PC4, for transferring display data from personal computer PC4 to projector PJ4.
Figure 26:
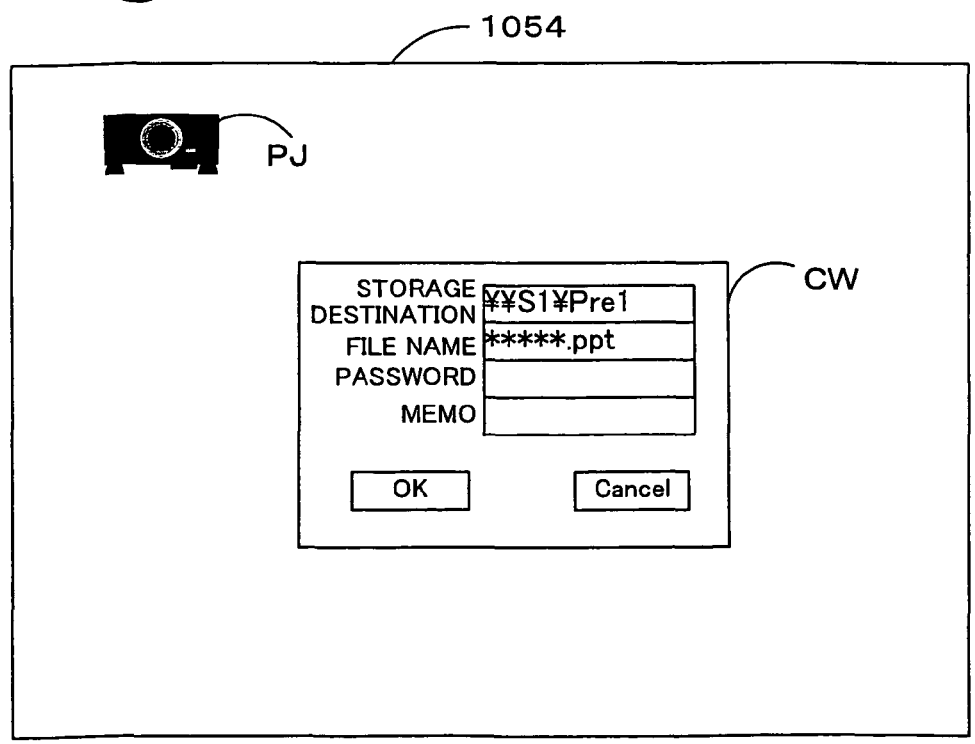
FIG. 26 is an illustrative diagram showing an example of an index file information setting screen that appears on display 1054 after the process shown in FIG. 25 has been completed.
Figure 27:
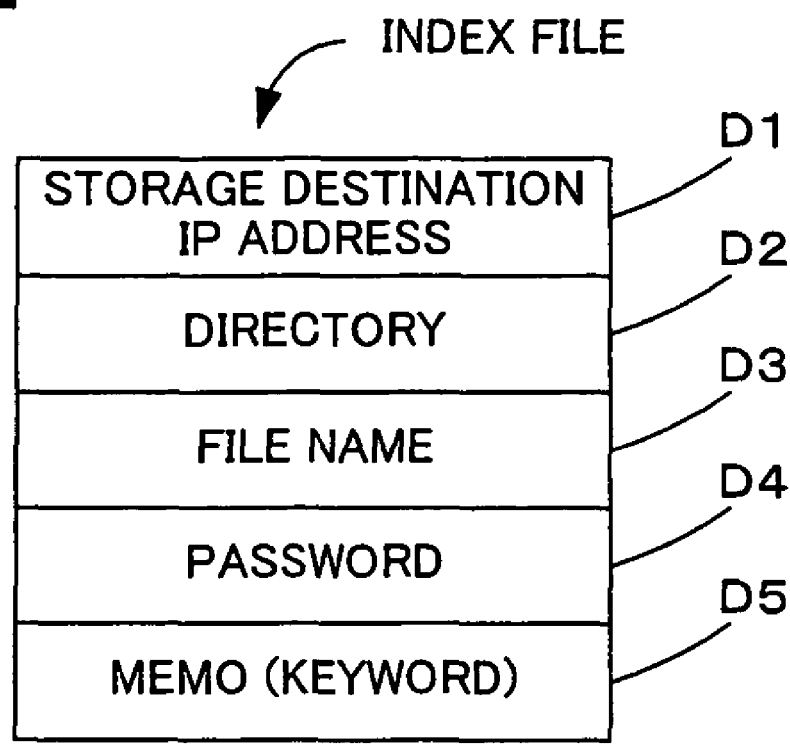
FIG. 27 is an illustrative diagram conceptually depicting data included in an index file.

D-3. Procedure for Transferring Index File to Projector in Accordance with this Embodiment in Image Display System, and Procedure for Displaying Data File Using Index File in Projector Next, a process executed when transferring a data file from a personal computer PC4 via a network to the projector PJ4 in accordance with this embodiment having the arrangement mentioned above is described with reference to FIG. 22 and FIG. 24 through FIG. 27. FIG. 24 is a flow chart showing a processing routine executed when transferring a data file from personal computer PC4 to projector PJ4. FIG. 25 is an illustrative diagram showing a conceptually a process executed on display 1054 of personal computer PC4, for transferring a data file from personal computer PC4 to projector PJ4. FIG. 26 is an illustrative diagram showing an example of an index file information setting screen that appears on display 1054 after the process shown in FIG. 25 has been completed. FIG. 27 is an illustrative diagram conceptually depicting data included in an index file.

Presentation data, word processor data etc. generated by executing an application program on personal computer PC4 is temporarily stored in RAM 1052 in personal computer PC4 during execution of the application program. At the time of closing the application program, it is stored as a data file on the internal HDD 1053 of personal computer PC4. Thus, HDD 1053 stores a plurality of data files including data files generated in the past.

In the processing routine shown in FIG. 24, the CPU 1050 of personal computer PC4 waits for issuance of a file store request (Step S100: No), and if issuance of a file store request is detected (Step S100: Yes), requests input of a file storage destination etc. (Step S110).

The typical OS of today enables various operations to be performed visually by means of a graphical user interface (GUI) displayed on display 1054. In this GUI environment, as shown in FIG. 25, for example, file icons FL associated with files stored in HDD 1053 are displayed in a window FE on display 1054, and an icon PJ representing projector PJ4 which is the transfer destination is displayed on display 1054. In the event of moving (transferring) a file in HDD 1053 to projector PJ4, the mouse pointer MP is placed over the desired file icon FL, and with the select button of mouse 1552 pressed down, the mouse pointer MP is moved over the projector icon PJ and the select button is released. This operation is a file movement operation well-known as drag and drop (D&D).

CPU 1050 of personal computer PC4 detects issuance of a file store request, when coordinate position of the mouse pointer MP, while the select button of mouse 1552 being pressed down, is placed on an area of projector icon PJ and the select button is released.

As shown in FIG. 26, CPU 1050 of personal computer PC4 displays a data file storage information setting screen CW for entering data file storage destination, file name, password, and memos. In this embodiment, the default value for storage destination is one indicating a predetermined directory in file server FS. Also, storage location information includes storage destination and file name. Passwords and memos are optional input items. In projector PJ4, memo information is displayed at the same time as file name of the data file as described later, and thus can be used, for example, as a keyword for a search, or a notation. During setting of a password, for example, five arbitrary numbers from 1 to 5 are entered via keyboard 1551.

CPU 1050 of personal computer PC4 determines whether or not the storage destination is the default value (Step S120), and if it is determined that the storage destination is the default value (Step S120: Yes), generates an index file (Step S130). On the other hand, if CPU 1050 determines that the storage destination is not the default value (Step S120: No), it modifies the storage destination (Step S140) and generates an index file (Step S130). As shown in FIG. 27, the index file is a file that includes the various data of data file storage destination IP address D1, directory D2, file name D3, password D4 and memo D5 (at time of setting) and does not include data contained in the data file per se. Thus, whereas the file size of a data file is typically about 10 KB to several MB, the file size of the index file is about 1-2 KB. In this embodiment, the storage destination is composed of the two data of data file storage destination IP address D1 and directory D2, and the storage location information is composed of the three data of data file storage destination IP address D1, directory D2 and file name D3.

CPU 1050 transfers the data file to the storage location—in this embodiment the file server FS—, transfers the index file to the external storage device 1041 of projector PJ4 (Step S150), and terminates the processing routine. That is, the data file is stored in file server FS, and the index file is stored in the external storage device 1041 of projector PJ4.

Figure 28:
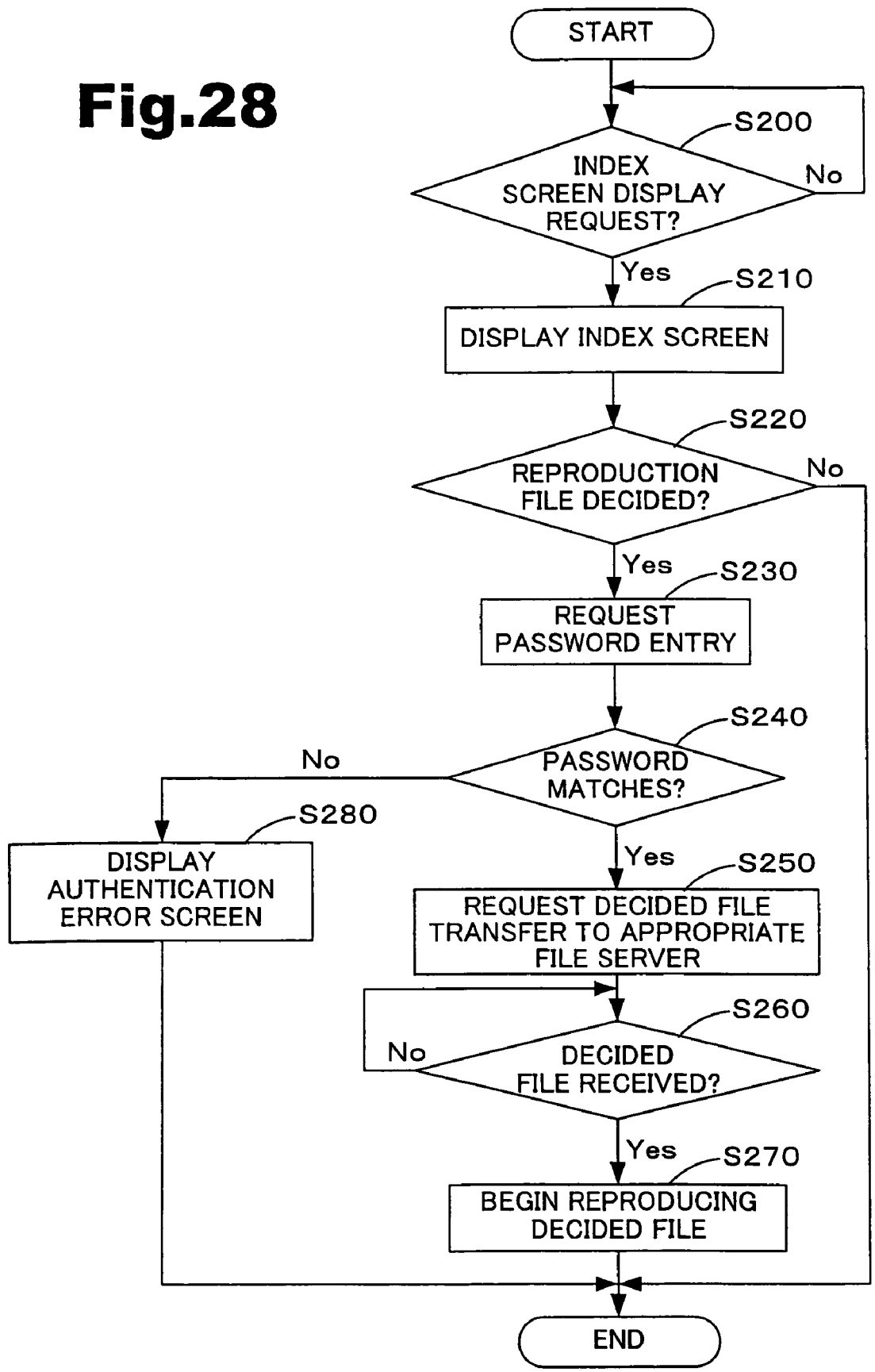
FIG. 28 is a flow chart showing a processing routine executed in projector PJ4 when reproducing a data file stored in an external storage device 1041.
Figure 29:
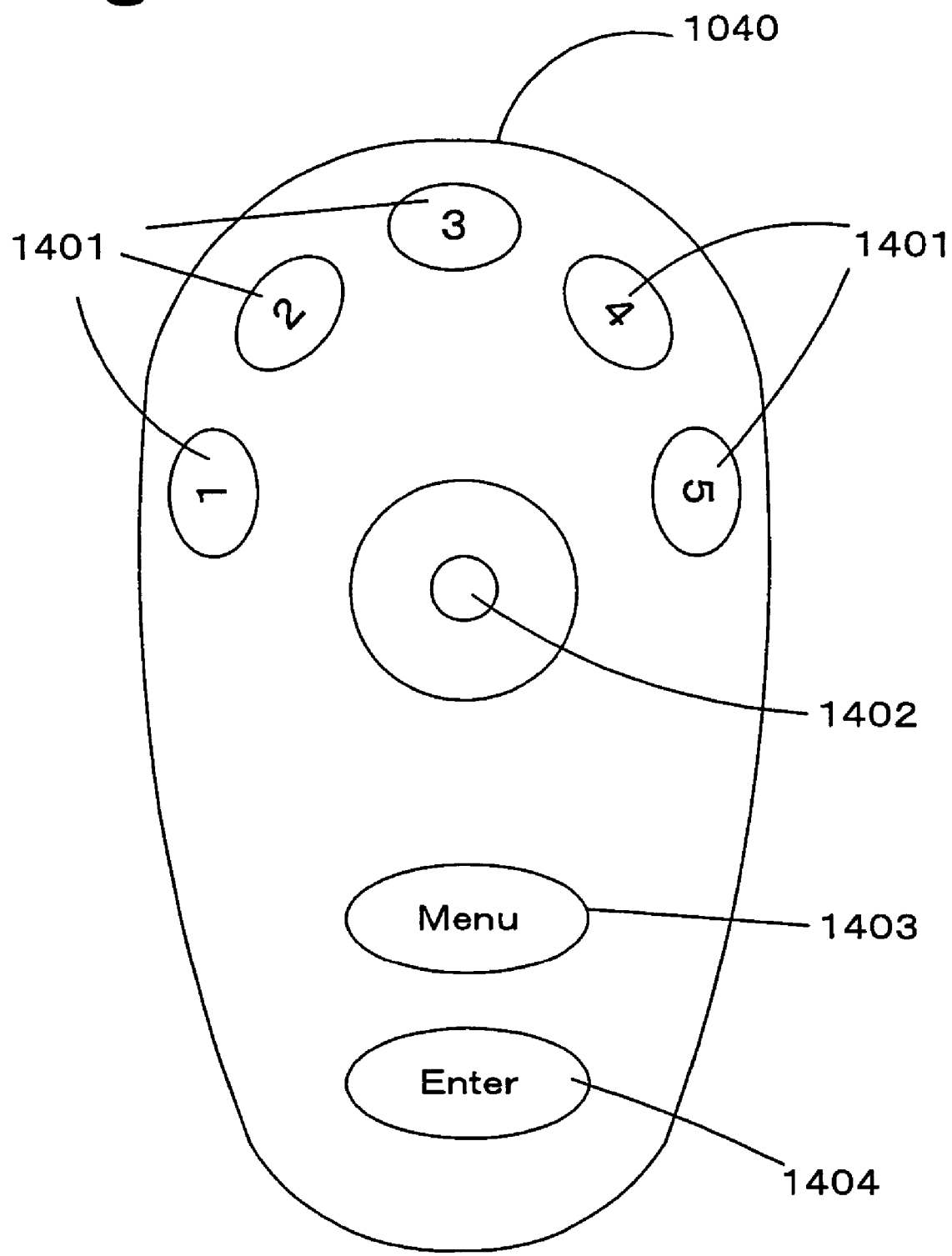
FIG. 29 is an illustrative diagram generically depicting a remote controller 1040 used in the fourth embodiment.
Figure 30:
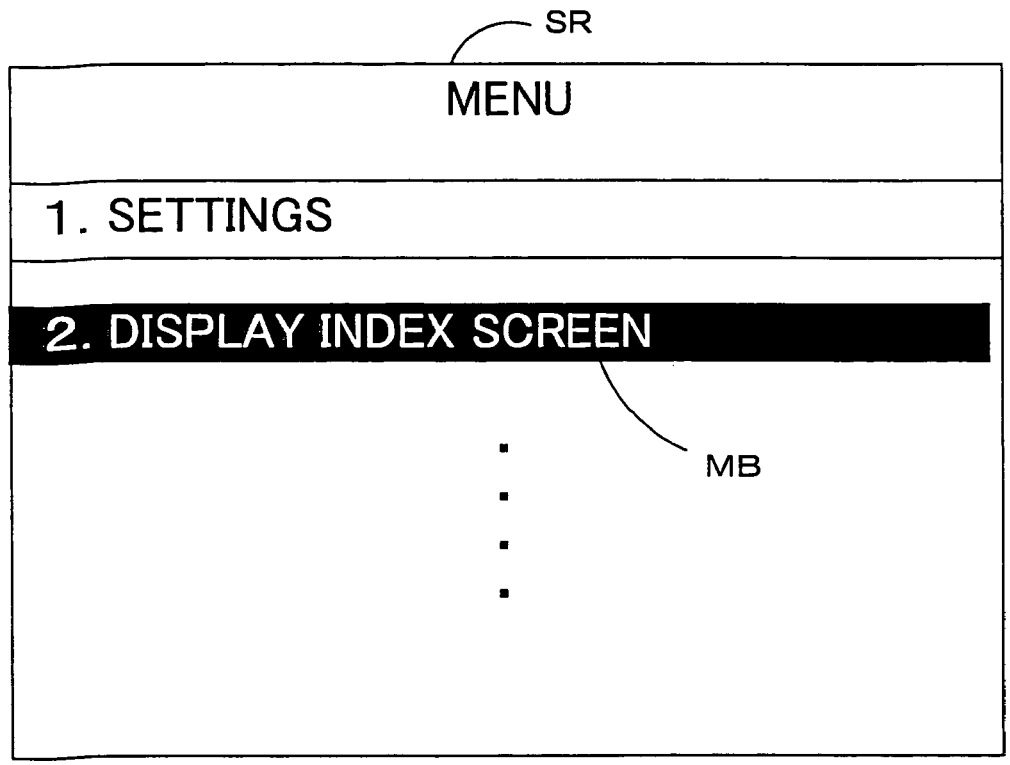
FIG. 30 is an illustrative diagram showing an example of a menu screen from among projection display screens SR of projector PJ4.
Figure 31:
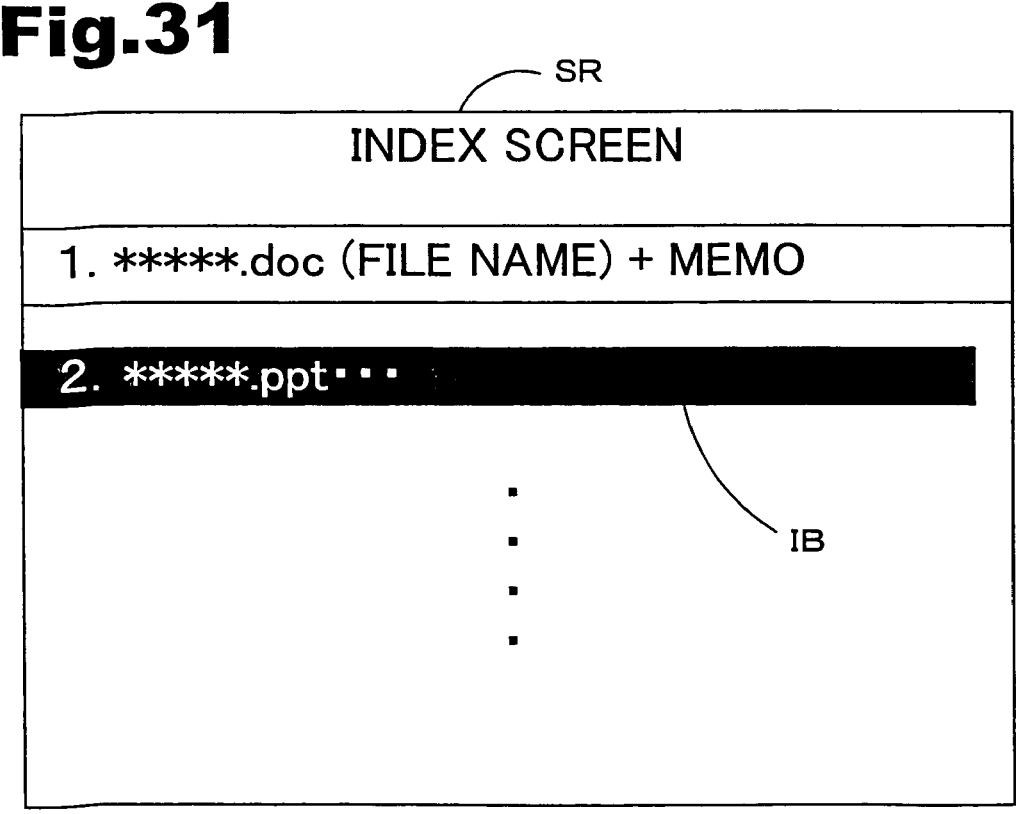
FIG. 31 is an illustrative diagram showing an example of an index screen from among projection display screens SR of projector PJ4.
Figure 32:
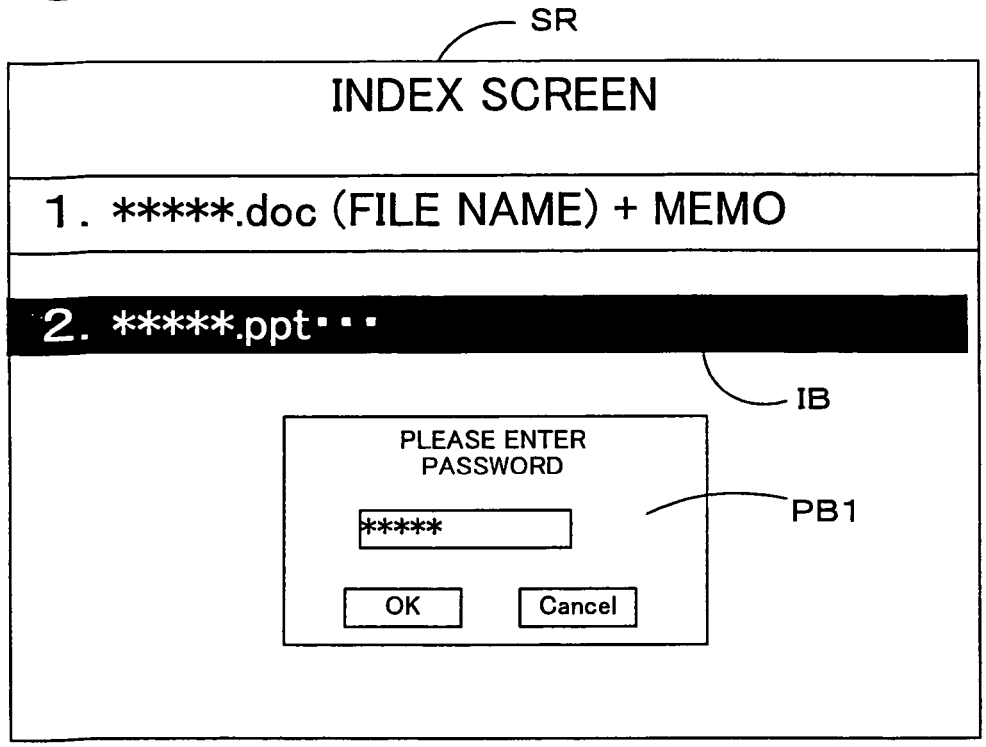
FIG. 32 is an illustrative diagram showing an example of a password input box PB1 display from among projection display screens SR of projector PJ4.
Figure 33:
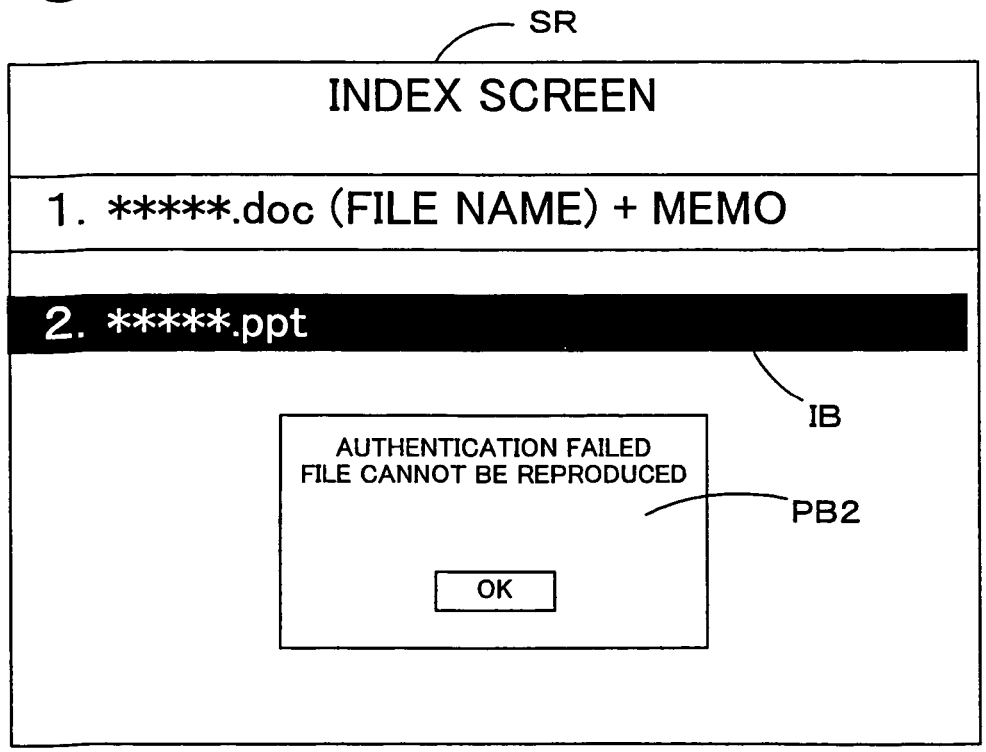
FIG. 33 is an illustrative diagram showing an example of an authorization failed display box PB2 display from among projection display screens SR of projector PJ4.

Next, a reproduction process executed in projector PJ4 when reproducing a data file stored in file server FS using an index file stored in external storage device 1041 is described with reference to FIG. 22, FIG. 23 and FIG. 28 through FIG. 33. FIG. 28 is a flow chart showing a processing routine executed in projector PJ4 when reproducing a data file stored in file server FS using an index file stored in an external storage device 1041. FIG. 29 is an illustrative diagram generically depicting a remote controller 1040 used in the fourth embodiment. FIG. 30 is an illustrative diagram showing an example of a menu screen from among projection display screens SR of projector PJ4. FIG. 31 is an illustrative diagram showing an example of an index screen from among projection display screens SR of projector PJ4. FIG. 32 is an illustrative diagram showing an example of a password input box PB1 display from among projection display screens SR of projector PJ4. FIG. 33 is an illustrative diagram showing an example of an authorization failed display box PB2 display from among projection display screens SR of projector PJ4.

In this processing routine, a remote controller 1040 for transmitting commands, as shown in FIG. 29, comprises 1-5 number keys 1401 that function as function keys for executing pre-assigned functions. Remote controller 1040 also comprises a joystick 1402 for moving a cursor or pointer position in the vertical or horizontal direction on a projected screen SR, a menu call-up key 1403, an execute key 1404, etc. Prior to starting the processing routine, the menu call-up key 1403 of remote controller 1040 is operated to project and display a menu screen like that shown in FIG. 30.

The first CPU 1200 of projector PJ4 awaits for input of an index screen display request via remote controller 1040 (Step S200: No). Meanwhile, through operation of joystick 1402 in the menu screen shown in FIG. 30, if execute key 1404 is pressed in state that a "2. Index Screen Display" menu bar MB1 is shown highlighted, first CPU 1200 determines that a file select request has occurred (input) (Step S200: Yes). When first CPU 1200 determines that a file select request has occurred (input), it requests second CPU 1300 to project an index screen like that shown in FIG. 31 (Step S210).

The index screen displays, of the information included in the index file stored in external storage device 1041, the file name and memo in index bar IB mode. Through operation of joystick 1402 in the index screen shown in FIG. 31, if execute key 1404 is pressed in state that a desired data file—here, "2. ***.ppt . . . "—index bar IB is shown highlighted, first CPU 1200** determines that reproduction of the highlighted data file has been decided (input).

First CPU 1200, upon determining reproduction of a data file (Step S220: Yes), requests input of the set password (Step S230). Specifically, first CPU 1200 requests second CPU 1300 to project the password input box PB1 shown in FIG. 32.

A password composed of a combination of numerals from 1-5 is entered into password input box PB1, via the function keys 1401 of remote controller 1040. First CPU 1200 determines whether or not the entered password matches the set password (Step S240). If determined that the two passwords match (Step S240: Yes), first CPU 1200 acquires, from the index file corresponding to the data file for which reproduction has been decided, the storage destination of the decided data file (file server FS) and requests transfer of the decided data file (Step S250).

First CPU 1200 waits for reception of the decided data file (Step S260: No), and when the decided data file is received from file server FS (Step S260: Yes), requests graphics controller 1210 for a drawing process of the decided file, and begins reproducing the decided file (Step S270). Image data drawn and generated in graphics controller 1210 is projected onto a screen via the video signal conversion circuit 1310, LCD drive circuit 1330, LCD 1332 and projection optical system 1360 of projector section 1030.

First CPU 1200, when it is determined that the password entered via remote controller 1040 does not match the set password (Step S240: No), requests second CPU 1300 for projected display of an authorization failed display box PB2 like that shown in FIG. 33 (Step S280), and does not reproduce the selected file. As regards incorrect password entry, reproduction of the decided file may be prohibited when password mismatches continue for more than a predetermined number of times.

According to this embodiment, when a data file is stored from personal computer PC4 to projector PJ4, an index file containing storage destination information required to acquire the data file via the network is created. Then there is provided an arrangement wherein an index file of small file size is stored in the external storage device 1041 of projector PJ4, and data file of large file size is stored in file server FS in the network. As noted, the file size of the index is about 1-2 KB. Thus, there is no need to provide projector PJ4 with an external storage device 1041 of large storage capacity, and irrespective of the memory capacity of external storage device 1041, data files of large file size can be substantially transmitted to projector PJ4. That is, since the index file includes storage destination information etc. for the data file, by transmitting the index file to the external storage device 1041 of projector PJ4, there can be devised an execution environment similar to that with the data file transferred to projector PJ4.

When reproducing a desired data file in projector PJ4, projector PJ4 uses the stored index file to identify the file server FS which is the storage destination of the data file, acquires the data file from the file server FS, and reproduces it. Thus, projector PJ4, even if the data file is not stored directly in external storage device 1041, by means of storing and utilizing an index file can reproduce the data file as if the data file had been stored in external storage device 1041. Also, as the file size of the index file is much smaller than the file size of the data file, whereby an advantage similar to that of storing more data files on the projector PJ4 can be effected without expanding the storage capacity of external storage device 1041. For example, even in the case of presentations being made by a large number of people, the projector PJ4 can be operated in a manner similar to that where all data files have been stored in the external storage device 1041 of projector PJ4.

Further, by storing index files in the external storage device 1041 of projector PJ4 and storing data files in a file server via the network, presentation can be performed using the projector PJ4 independently, without connecting a personal computer PC4. By means of this, the labor of connecting a personal computer PC4 each time the projector PJ4 is to be used can be dispensed with.

Also, in the above embodiment, on display 1054 of personal computer PC4, by dragging and dropping a file icon FL onto the projector icon, an index file is automatically generated on the basis of the data file. The generated index file can be transferred to and stored in projector PJ4 while the data file is transferred to and stored in an arbitrary storage destination (in this embodiment, a file server FS), so the file transfer/storage operation can be performed easily visually. Also, during data file transfer, a password can be set to protect the confidentiality of the data file.

Further, in the above embodiment, when the reproduction of a data file for which a password has been set is instructed, projector PJ4 displays a password input box PB on projection display screen SR and prompts for entry of the set password. Also, by determining whether or not the entered password matches the set password on the basis of password information included in the index file, the password authentication procedure can be completed prior to requesting transfer of the data file. Accordingly, as long as the password does not match, the data file will not be transferred from the file server FS to the projector PJ4, preventing the data file from being accessed by a third party. Also, since the data file is not transferred as long as the password does not match, traffic over the network line NL can be reduced.

D-4. Modifications of Fourth Embodiment

In the above embodiment, the transfer/storage destination for a data file when its file icon is dragged and dropped over the projector icon PJ on display 1054 is a file server FS, but transfer/storage could be done on another personal computer as the terminal.

Also, where the personal computer PC4 has a PCMCIA slot, the transfer destination of the index file from personal computer PC4 may be a PC memory card housed in the PCMCIA slot. In such a case, by transferring the index file to the PC memory card in personal computer PC4 in advance, and then inserting the PC memory card into projector PJ4, this arrangement may obtain functions and advantages similar to that of the above embodiment.

In the above embodiment, a single index file is generated for (associated with) a single data file, but a single index file could be associated with a plurality of data files. In this case, where there is a request for transfer of data files that will be used in sequence, transfer of a plurality of data files may be requested using a single index file, without using a plurality of index files.

In the above embodiment, the three data of data file storage destination IP address D1, directory D2 and file name D3 are used as storage location information, but where one directory is assigned to each date file, storage location information may be composed of storage destination IP address D1 and directory D2. In either case, it is sufficient for data files to be recognized (identified) on the basis of index files.

In the above embodiment, the password is set using numerals from 1-5, but this limitation is imposed simply by the numerals that can be entered by means of the remote controller 1040 as described earlier, and where the remote controller 1040 can input numerals other than 1-5 or characters, etc., passwords can of course be set using numerals other than 1-5 or characters, etc. For example, by providing remote controller 1040 with a liquid crystal display window, passwords such as characters may be entered using joystick 1402. Alternatively, various numerals or characters can be entered using a wireless keyboard etc.

In the above embodiment, the display screen on the display 1054 and the projected display screen SR are merely exemplary, and may of course by modified appropriately when reduced to practice.

As noted, in the above embodiment, the name of ASP terminal section 1020 is assigned to the network terminal section, but there is no need for projector JP4 to necessarily be an ASP terminal or to be called an ASP terminal. For example, it may receive application data (files) via a network, open the files by means of a viewer application program or other application programs, and project the display screen thereof. In this case, file format may be determined in the projector PJ4 and an appropriate viewer run automatically, or a Run command for running an appropriate viewer may be supplied simultaneously together with the file to the projector PJ4 from a server.

In the above embodiment, the ASP terminal section 1020 and the projector section 1030 each comprises a CPU, RAM and ROM; but these may be provided to the ASP terminal section 1020 only. In this case, the CPU in the ASP terminal section 1020 will execute control of the projector section 1030.

In the above embodiment, the projector section 1030 comprises an external video signal input terminal 1312 and an external audio signal input terminal 1322, but where it is a network connection-dedicated projector, these may be omitted. This is because in this case, image data and audio data are supplied via the network line NL.

In the above embodiment, there are provided various interface controllers, but with the exception of the network interface controller 1220 these may be omitted.

The present invention has been shown and described hereinabove on the basis of embodiments, but the invention is not limited to the embodiments and aspects set forth hereinabove, and may be reduced to practice in various modes without departing from the scope thereof, for example, the following modifications are possible.

(1) In the above embodiments, the projector (i.e. projection type display device) comprises a liquid crystal light valve as an electro-optical device, but instead a micro-mirror type light modulating device, CRT etc. could be provided. As a micro-mirror type light modulating device there may be used, for example, DMD (digital micro-mirror device) (trademark of TI Corp.). As the electro-optical device, any device capable of forming image light in response to image data is acceptable.

(2) In the above embodiments, some of the elements implemented by means of hardware may be substituted by software, and conversely some of the elements implemented by means of software may be substituted by hardware.

Industrial Applicability

This invention is applicable, for example, in various projectors capable of projected display of images.

What is claimed is:

1. A scenario creating device for creating a scenario file to be supplied to a scenario reproducing device, the scenario creating device comprising:
   an input section; and
   a scenario creating section for creating the scenario file and at least one image file based on a file of a first predetermined format including pagewise scenario information and image information in accordance with an operation of the input section, wherein the scenario creating section creates the scenario file of a second predetermined format on the basis of the pagewise scenario information included in the file of the first predetermined format, the scenario file causing pagewise sequential display of images in accordance with the at least one image file,
   the scenario creating section creates the at least one image file of a third predetermined format on the basis of the image information included in the file of the first predetermined format, and
   the scenario file includes display time information included in the file of the first predetermined format as the pagewise scenario information.

2. A scenario creating method for creating a scenario file in a scenario creating device comprising an input section, the scenario file being supplied to a scenario reproducing device, the method comprising the steps of:
   (a) receiving a file of a first predetermined format including pagewise scenario information and image information in accordance with an operation of the input section; and
   (b) creating the scenario file of a second predetermined format on the basis of the pagewise scenario information included in the file of the first predetermined format, and creating at least one image file of a third predetermined format on the basis of the image information included in the file of the first predetermined format, wherein the scenario file causes pagewise sequential display of images in accordance with the at least one image file, and
   the scenario file includes display time information included in the file of the first predetermined format as the pagewise scenario information.

3. The scenario creating method according to claim 2, further comprising supplying the created scenario file and the at least one image file to a memory card.

4. The scenario creating method according to claim 2, further comprising creating an audio file when audio information is included in the file of the first predetermined format.

5. The scenario creating method according to claim 2, the method further comprising generating the at least one image file of a third predetermined format on the basis of image information included in the file of the first predetermined format, the third predetermined format being different from the first predetermined format.

6. A non-transitory computer-readable storage medium storing a computer program for creating a scenario file and at least one image file in a scenario creating device comprising an input section, the scenario file being supplied to a scenario reproducing device, the computer program causing a computer to implement the functions of:
   (a) receiving a file of a first predetermined format including pagewise scenario information and image information in accordance with an operation of the input section; and
   (b) creating the scenario file of a second predetermined format on the basis of the pagewise scenario information included in the file of the first predetermined format, and creating at least one image file of a third predetermined format on the basis of the image information included in the file of the first predetermined format, wherein the scenario file causes pagewise sequential display of images in accordance with the at least one image file, and
   the scenario file includes display time information included in the file of the first predetermined format as the pagewise scenario information.

7. The non-transitory computer readable storage medium according to claim 6, furthering comprising storing a program for supplying the created scenario file and the at least one image file to a memory.

8. The non-transitory computer readable storage medium according to claim 6, further comprising storing a program for creating an audio file when audio information is included in the file of the first predetermined format.

9. The non-transitory computer-readable storage medium according to claim 6, further comprising generating the at least one image file of a third predetermined format on the basis of the image information included in the file of the first predetermined format, the third predetermined format being different from the first predetermined format.

* * * * *